(12) United States Patent
Wigren et al.

(10) Patent No.: US 9,049,550 B2
(45) Date of Patent: Jun. 2, 2015

(54) NODES AND METHODS FOR POSITIONING

(71) Applicant: Telefonaktiebolaget LM Ericsson (publ), Stockholm (SE)

(72) Inventors: Torbjörn Wigren, Uppsala (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/030,060

(22) Filed: Sep. 18, 2013

(65) Prior Publication Data
US 2014/0018103 A1    Jan. 16, 2014

Related U.S. Application Data

(62) Division of application No. 13/266,937, filed as application No. PCT/SE2011/050509 on Apr. 27, 2011.

(60) Provisional application No. 61/431,963, filed on Jan. 12, 2011.

(51) Int. Cl.
*H04W 24/00* (2009.01)
*H04W 4/02* (2009.01)
*G01S 5/00* (2006.01)
*G01S 5/02* (2010.01)
*H04W 64/00* (2009.01)

(52) U.S. Cl.
CPC ............. *H04W 4/02* (2013.01); *H04W 4/021* (2013.01); *G01S 5/0009* (2013.01); *G01S 5/0252* (2013.01); *H04W 64/00* (2013.01)

(58) Field of Classification Search
CPC ....... H04W 64/00; H04W 4/02; H04W 4/021; H04W 4/028; H04W 12/08; H04W 48/04; G01S 5/0009; G01S 5/0252; G06F 17/30174; G06F 17/30194
USPC .......... 455/456.1, 456.2, 456.3, 456.5, 456.6, 455/404.2, 432.1, 435.1
See application file for complete search history.

(56) References Cited

U.S. PATENT DOCUMENTS

| | | | |
|---|---|---|---|
| 7,706,339 B2 * | 4/2010 | Shaffer et al. ................. | 370/338 |
| 2004/0180669 A1 * | 9/2004 | Kall .......................... | 455/456.1 |
| 2009/0093259 A1 | 4/2009 | Edge et al. | |
| 2010/0127919 A1 * | 5/2010 | Curran et al. ............ | 342/357.07 |
| 2012/0246074 A1 * | 9/2012 | Annamalai et al. ............ | 705/44 |

OTHER PUBLICATIONS

U.S. Appl. No. 13/266,937, filed Jan. 11, 2011; Inventor: Wigren et al.
Office Action mailed Aug. 13, 2013 in U.S. Appl. No. 13/266,937.

(Continued)

*Primary Examiner* — Khai M Nguyen
(74) *Attorney, Agent, or Firm* — Baker Botts, LLP

(57) ABSTRACT

A method in an LCS server of a wireless communication system is provided for positioning of an LCS target. Information is obtained relating to a first predefined geographical area, where it has been determined that a probability that the LCS target is located within the first predefined geographical area is below a threshold. A request is received for a positioning of the LCS target and the obtained information relating to the first predefined geographical area is used for the positioning of the LCS target.

16 Claims, 10 Drawing Sheets

(56) References Cited

OTHER PUBLICATIONS

International Search Report and Written Opinion in related PCT International Application No. PCT/SE2011/050509 dated Nov. 29, 2011.

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10), 3GPP Standard; 3GPP TS 36.305, $3^{rd}$ Generation Partnership Project (3GPP) Mobile Competence Centre; 650, Route Des Lucioles; F-06921 Sophia-Antipolis Cedex; France, No. V10.0.0, Dec. 17, 2010, pp. 1-51, XP050462121.

3rd Generation Partnership Project; Technical Specification Group Services and System Aspects; Universal Geographical Area Description (GAD) (Release 9), 3GPP Standard; 3GPP TS 23.032, $3^{rd}$ Generation Partnership Project (3GPP), Mobile Competence Centre; 650, Route Des Lucioles; F-06921 Sophia-Antipolis Cedex; France, No. v9.0.0, Dec. 11, 2009, pp. 1-29, XP050400699.

3rd Generation Partnership Project; Technical Specification Group Services and System Aspects; Functional stage 2 description of Location Services (LCS) (Release 10), 3GPP Standard; 3GPP TS 23.271, $3^{rd}$ Generation Partnership Project (3GPP), Mobile Competence Centre; 650, Route Des Lucioles; F-06921 Sophia-Antipolis Cedex; France, No. V10.1.0, Dec. 17, 2010, pp. 1-170, XP050462092.

\* cited by examiner

NODES AND METHODS FOR POSITIONING

PRIORITY APPLICATIONS

This application is a divisional of U.S. patent application Ser. No. 13/266,937, filed on Oct. 28, 2011, which is the U.S. national phase of international application no. PCT/SE2011/050509 filed 27 Apr. 2011 which designated the U.S. and claims priority to U.S. Provisional Application No. 61/431,693 filed 11 Jan. 2011, and the entire contents of each of which are hereby incorporated by reference.

TECHNICAL FIELD

The technical field of the present disclosure relates to positioning in wireless communication systems. More particularly, the technology relates to a Location Services (LCS) server, to an LCS client, and to a method for positioning of an LCS target.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a user equipment (UE) is wirelessly connected to a Base Station (BS) commonly referred to as a NodeB and an evolved NodeB (eNodeB) respectively. Each BS serves one or more areas referred to as cells.

The possibility of identifying the geographical location of users in the wireless networks has enabled a large variety of commercial and non-commercial services, e.g., navigation assistance, social networking, location-aware advertising, and emergency services. Different services may have different positioning accuracy requirements imposed by the application. Furthermore, some regulatory requirements on the positioning accuracy for basic emergency services exist in some countries, such as E911 from the Federal Communications Commission (FCC) in US and corresponding E112 in Europe.

In many environments, the position may be accurately estimated by using positioning methods based on Global Positioning System (GPS). However, GPS is known to be associated with high costs due to higher UE complexity, a relatively long time to first positioning fix, and a high UE energy consumption due to a need for large computational resources, resulting in fast battery drain. Today's networks often have a possibility to assist UEs in order to improve the terminal receiver sensitivity and the GPS startup performance through Assisted-GPS (A-GPS) positioning. However, GPS or A-GPS receivers are not necessarily available in all wireless UEs, and some wireless communications systems do not support A-GPS. Furthermore, GPS-based positioning may often have unsatisfactory performance in urban canyons and indoor environments. There is therefore a need for complementary terrestrial positioning methods. There are a number of different terrestrial positioning methods. One example is Observed Time Difference of Arrival (OTDOA) in LTE.

Nevertheless, methods with traditionally lower accuracy such as those exploiting cell identities or fingerprints are still of high importance and may become particularly important for dense wireless network deployments. In dense network deployments the coverage area of lower power BSs is typically small and the resulting positioning results may therefore be quite accurate. These positioning results are also achievable at a very short response time, and with low complexity and resource consumption. Low resource consumption is particularly important for talk time and standby device performance.

The three key network elements in an LTE positioning architecture are the Location Services (LCS) Client, the LCS target and the LCS Server. The LCS Server is a physical or logical entity managing positioning for an LCS target by collecting measurements and other location information, assisting the UE in performing measurements when necessary, and estimating the LCS target location. An LCS Client is a software and/or hardware entity that interacts with an LCS Server for the purpose of obtaining location information for one or more LCS targets. The LCS target is the entity that is being positioned. LCS Clients may reside in the LCS targets themselves. In the positioning procedure, an LCS Client sends a positioning request to an LCS Server to obtain location information, and the LCS Server processes and serves the received request and sends the positioning result and optionally a velocity estimate to the LCS Client. The positioning request may originate from the UE or the network.

In LTE, there exist two positioning protocols operating via the radio network: the LTE Positioning Protocol (LPP) and the LTE Positioning Protocol annex (LPPa). The LPP is a point-to-point protocol between the LCS server and the LCS target, used for the positioning of the LCS target. LPP may be used both in a user plane and a control plane positioning procedure, and multiple LPP procedures are allowed in series and/or in parallel thereby reducing latency. LPPa is a protocol between the eNodeB and the LCS server specified only for control plane positioning procedures, although it still may assist user plane positioning by the querying of eNodeBs for information and measurements. A Secure User Plane Location (SUPL) protocol is used as a transport protocol for LPP in the user plane.

A block diagram illustrating an example of a high-level positioning architecture is given in FIG. 1. The LCS target is a UE 150, and the LCS server 100 is an Evolved Serving Mobile Location Center (E-SMLC) 101. The LCS server 100 may also comprise a SUPL Location Platform (SLP) 102. The control plane positioning protocols LPP between the UE 150 and the E-SMLC 101, LPPa between an eNodeB 130 and the E-SMLC 101, and LCS-Application Protocol (AP) between a Mobile Management Entity (MME) 120 in a Core Network (CN) and the E-SMLC 101, are illustrated with arrows. The user plane positioning protocols are also illustrated and comprises SUPL/LPP between the UE 150 and the SLP 102, and the SUPL between the UE 150 and the SLP 102. The SLP 102 may comprise two components, a SUPL Positioning Center (SPC) and a SUPL Location Center (SLC), which may also reside in different nodes. In an example implementation, the SPC has a proprietary interface with the E-SMLC 101, and Llp interface with the SLC, and the SLC part of the SLP communicates with a Packet data network GateWay (P-GW) 160 and an external LCS Client 110. Additional positioning architecture elements may also be deployed to further enhance performance of specific positioning methods. For example, deploying radio beacons 140 is a cost-efficient solution which may significantly improve positioning performance indoors and also outdoors by allowing more accurate positioning, for example, with proximity location techniques.

Positioning results may be signaled between:

The LCS target 150 and the LCS server 100, e.g. over the LPP;

LCS/positioning servers 100, such as between the E-SMLC and the SLP, over standardized or proprietary interfaces;

The LCS/positioning server 100 and other network nodes, such as between the E-SMLC and the MME, a Mobile Switching Centre (MSC), aGateway Mobile Location Center (GMLC), Operation and Maintenance (O&M) nodes or Self Organizing Nodes (SON);

The LCS/positioning server 100 and the LCS client 110, such as between the E-SMLC and a Public Safety Answer Point (PSAP) or between the SLP and an external LCS client.

To meet Location Based Services (LBS) demands, the LTE network will deploy a range of complementing methods characterized by different performance in different environments. Depending on where the measurements are conducted and the final position is calculated, the methods may be UE-based, UE-assisted or network-based, each with its own advantages. The following methods are available in the LTE standard for both the control plane and the user plane:

Cell Identity (CID) positioning;

UE-assisted and network-based Enhanced-CID (E-CID), including network-based Angle of Arrival (AoA) positioning;

UE-based and UE-assisted A-GPS positioning, or the more general Assisted Global Navigation Satellite System (A-GNSS) positioning; and UE-assisted OTDOA positioning.

Hybrid positioning methods, fingerprinting positioning, and Adaptive ECID (AECID) do not require additional standardization and are therefore also possible in LTE. Furthermore, there may also be UE-based versions of the methods above, e.g. UE-based GNSS/GPS, and UE-based OTDOA. There may also be some alternative positioning methods such as civic address based positioning or proximity based location. Uplink Time Difference Of Arrival (UTDOA) currently under discussion in 3GPP may also become standardized in a coming LTE release.

CID positioning: Cellular systems are divided into cells, each cell served by one specific BS. Each BS may serve more than one cell. One important point from a positioning and navigation perspective is that the cell where a specific UE is located is known in the cellular system. Hence, after determination of the geographical area covered by a specific cell, it may be stated that the UE is located somewhere within said geographical area, as long as it is connected and the reported cell identity of the serving cell is equal to the cell identity of the particular geographical area. In several systems, the preferred representation of the geographical area of the cell is given by the cell polygon format. The cell area described by a polygon is an approximation, and the polygon is normally pre-determined in the cell-planning tool to represent the cell area with a certain confidence. The confidence is the probability that the terminal is actually located within the reported area, in this case bounded by the cell polygon. Although the accuracy of the method is limited by the cell range, its main advantages are a very low response time as well as the fact that it has no impact on the UE, it is easy to implement, and it is widely spread and always available where there is cellular coverage. To exploit these advantages and enhance the CID technique, the accuracy of CID is further improved in the E-CID method.

E-CID positioning: E-CID methods exploit four sources of position information: the CID and a corresponding geographical description of the serving cell, a Timing Advance (TA) of the serving cell, the CIDs and corresponding signal measurements of measured cells, which may be up to 32 cells in LTE, including the serving cell, as well as AoA measurements. The following techniques are commonly used for E-CID:

CID and TA: A combination of the geographical cell description, the eNodeB position, and the distance between the eNodeB and the UE obtained from a TA measurement;

Signal strength: Distance measures are derived from signal strengths measured in the UE and combined with cell polygons as for CID and TA;

AoA: As an example the angle of a UE with respect to a reference direction which is the geographical North may be defined.

AoA combined with TA, exploiting the orthogonal directionality of the two involved measurements.

TDOA or Time of Arrival (TOA) based methods such as OTDOA, UTDOA or GNSS/A-GNSS: OTDOA is a method based on time difference measurements conducted on downlink positioning reference signals received from multiple locations, where the user location is further calculated by multi-lateration. UTDOA, which is an uplink version of OTDOA, is a method that exploits uplink time of arrival or time difference of arrival measurements performed at multiple receiving points. The UTDOA measurements are to be based on Sounding Reference Signals (SRS). A-GNSS/GNSS is a group of methods using satellite signal measurements, where GPS developed in the US and Galileo developed in Europe are some examples of GNSS systems with close to global coverage.

Radio Frequency (RF) Fingerprinting: The method exploits received signal strength measurements from the UE together with the corresponding cell identities to map onto a predetermined geographical map of the radio properties. The maps may be obtained by extensive site surveying or by radio signal strength simulation software.

AECID: The AECID method enhances fingerprinting positioning performance by extending the number of radio properties that are used. At least CIDs, TA and AoA may be used in addition to received signal strengths. Corresponding databases are automatically built up by collecting high precision OTDOA and A-GNSS positions, tagged with measured radio properties. The AECID procedure comprises the following steps for building up information supporting the positioning:

1. Tagging of high-precision position results (e.g. A-GPS measurements) with at least one of CIDs of detected cells, auxiliary connection information (e.g. radio access bearer and time), and quantized auxiliary measurements (e.g. TA or signal strength).
2. Collection of all high precision measurements with the same tag in high precision measurement clusters.
3. Calculation of a tagged polygon which contains a pre-specified fraction of said clustered high precision position measurements in the interior, thereby providing a polygon with a known confidence value. The confidence is the probability that the UE is actually located in the reported area.
4. Storage of said tagged polygons in a database of polygons.

When an AECID positioning is to be performed, the following steps are performed:

a) Determination of at least one of CIDs of detected cells, auxiliary connection information, and quantized auxiliary measurements;
b) Formation of the tag;
c) Retrieval of the polygon corresponding to said tag, from the information built up as described above.
d) Reporting of said polygon.

According to the 3GPP definition, a heterogeneous network comprises two or more layers, where each layer is served by one type of BS class or type. A heterogeneous network may enhance capacity in dense traffic areas or hotspots and may also be used for coverage extension. One example is a two-layered macro/femto heterogeneous network, where the macro cell layers and femto cell layers typically comprise macro BS and home BS, respectively. A home BS, sometimes also called a femto BS, typically serves private premises or small office environment. Another main characteristic of the home BS is that it is typically owned by a private subscriber. An access control mechanism for the home BS decides if a given UE may or may not connect to that home BS. In UTRAN and E-UTRAN, a concept of Closed Subscriber Groups (CSG) exists. According to the CSG concept only a subset of UEs, defined by the owner of the home BS, may wirelessly access or connect to that particular home BS. Hence wireless access for other UEs is denied by the CSG based home BS. Therefore different cell reselection rules will apply for different UEs with CSG cells in the macro deployment area. This is not taken into account in conventional positioning methods that are based on cell identities, which may make the positioning results inaccurate.

SUMMARY

An object is therefore to address some of the problems and disadvantages outlined, and to allow the usage of information relating to geographical areas where it is unlikely that the UE is located, for the purpose of positioning.

In accordance with an embodiment, a method in a location services, LCS, server of a wireless communication system, for positioning of an LCS target, is provided. The method comprises obtaining information relating to a first predefined geographical area. It has been determined that a probability that the LCS target is located within the first predefined geographical area is below a threshold. The method further comprises receiving a request for a positioning of the LCS target, and using the obtained information relating to the first predefined geographical area for the positioning of the LCS target.

In accordance with a second embodiment, a method in a location services, LCS, client of a wireless communication system, for positioning of an LCS target, is provided. The positioning is managed by an LCS server interacting with the LCS client for the positioning of the LCS target. The method comprises receiving information relating to a first predefined geographical area from the LCS server, wherein it has been determined that a probability that the LCS target is located within the first predefined geographical area is below a threshold. The method further comprises using the received information for the positioning of the LCS target.

In accordance with a third embodiment, a location services, LCS, server configured to be used in a wireless communication system for positioning of an LCS target is provided. The LCS server comprises a processing unit configured to obtain information relating to a first predefined geographical area, wherein it has been determined that a probability that the LCS target is located within the first predefined geographical area is below a threshold. The processing unit is further configured to receive a request for a positioning of the LCS target, and use the obtained information relating to the first predefined geographical area for the positioning of the LCS target.

In accordance with a fourth embodiment, a location services, LCS, client configured to be used in a wireless communication system for positioning of an LCS target is provided. The positioning is managed by an LCS server interacting with the LCS client for the positioning of the LCS target. The LCS client comprises a processing unit configured to receive information relating to a first predefined geographical area from the LCS server, wherein it has been determined that a probability that the LCS target is located within the first predefined geographical area is below a threshold. The processing unit is further configured to use the received information for the positioning of the LCS target.

An advantage of particular embodiments is that using information relating to geographical areas where it is unlikely that the UE is located in positioning procedures makes the positioning of the UE more accurate.

Other objects, advantages and features of embodiments will be explained in the following detailed description when considered in conjunction with the accompanying drawings and claims.

DETAILED DESCRIPTION

Figure 1:
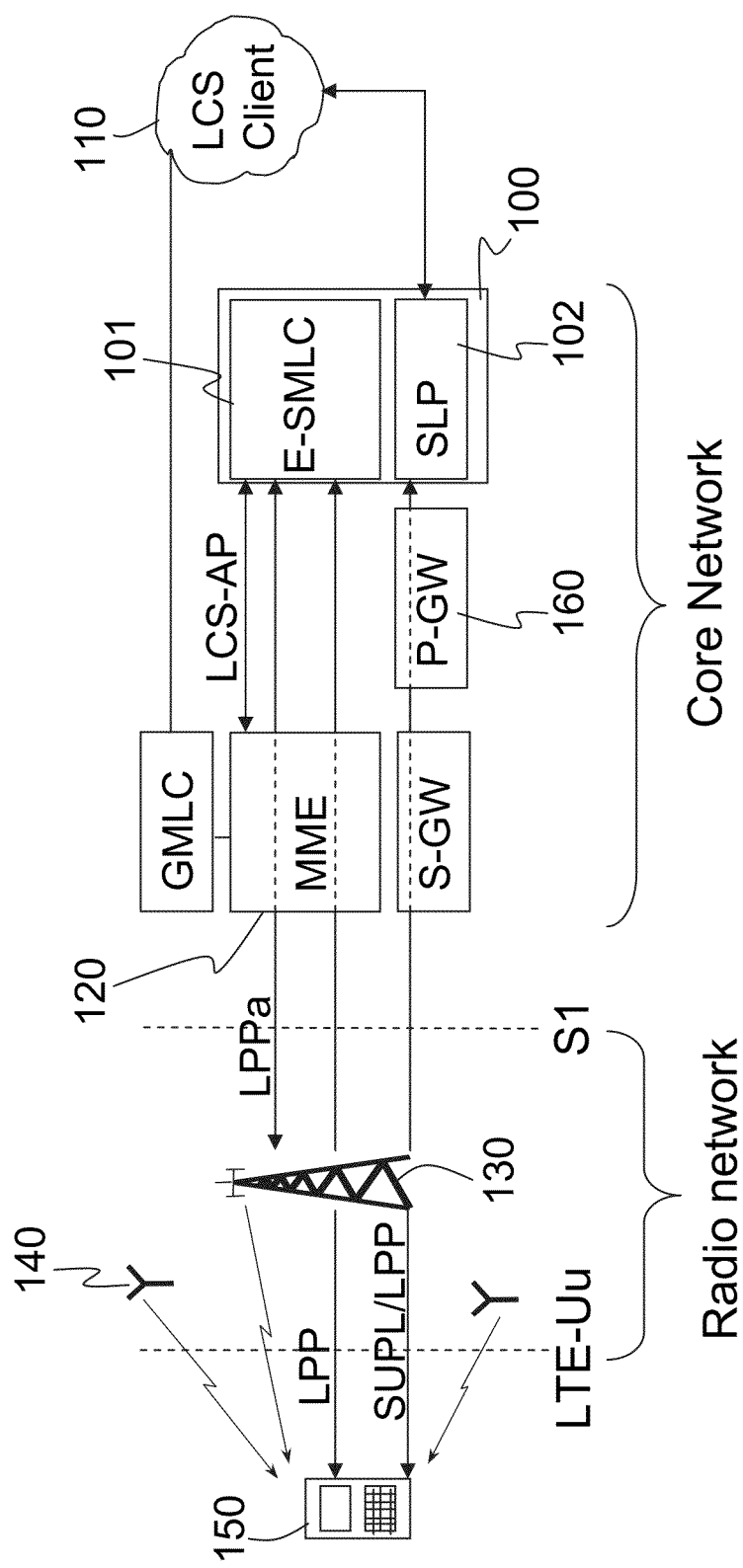
FIG. 1 is a block diagram illustrating schematically the positioning architecture in an LTE system.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described herein by way of reference to particular example scenarios. Particular aspects are described in a non-limiting general context in relation to a an LTE system. However, it should be noted that the embodiments may also be applied to other types of wireless communication systems and Radio Access Technologies (RAT) supporting positioning such as GSM, UMTS, LTE-Advanced, cdma2000, WiMAX, and WiFi, as well as multi-RAT systems. Furthermore, the signaling described in the disclosure may be either via direct links or logical links, e.g. via higher layer protocols and/or via one or more network nodes. For example, the signaling of positioning results between the E-SMLC and the PSAP in LTE is done via multiple nodes comprising at least the MME and the GMLC.

Although the description of the example scenarios mainly mentions positioning of UEs, it should be understood that the UE is a non-limiting term which means any wireless device or node such as a PDA, laptop, mobile, sensor, relay, or even a small BS that is being positioned, i.e. an LCS target in general. Furthermore, a positioning node described in different embodiments is a node with positioning functionality. For LTE it may be understood as a positioning platform in the user plane such as the SLP, or a positioning node in the control plane such as the E-SMLC. SLP may also consist of SLC and SPC, where SPC may also have a proprietary interface with E-SMLC.

In the description, first positioning result, second positioning result, and third positioning results are used in several places as general terms to refer to a first area, a second area and a third area, respectively, where the area shall be understood as a formalized description of a geographical area, i.e. in a broader sense than a final positioning result. It may e.g. be an intermediate result of a positioning process, an area corresponding to a cell description provided by an O&M system, or a boundary of a cluster extracted from an AECID database.

A polygon format is described by a list of 3-15 latitude, longitude corners, encoded in World Geodetic System (WGS) 84 co-ordinates. Currently, uncertainty information for the polygon format is included implicitly. No confidence may be reported with the polygon. However, the polygon is typically pre-determined in a cell planning step which describes the cell area with a certain confidence. The confidence is the probability that the terminal is actually located within the reported area, in this case bounded by the cell polygon.

For e.g. AECID, polygon fusion or merging operations, and polygon or measurement cluster splitting operations have been defined for operations on polygons. Splitting operations are defined for the splitting of a cluster of high precision position measurement into multiple smaller clusters. In this way multiple polygons corresponding to the original cluster are created for each tag. The multiple polygons for a tag taken together covers a smaller area than a single polygon would. This may be useful e.g. when doing a position estimation from multiple results such as multiple positioning methods, or when the reporting of multiple shapes is possible. Geographically distinct areas, areas in hilly terrain, and separate coverage areas of cells in front of and behind an antenna are examples of areas where splitting may be useful. Fusion or merging of at least two sub-polygons may be used for merging geographically non-overlapping polygons of sub-clusters to one polygon, representing all or a subset of said sub-clusters. It may also be used for merging overlapping polygons of sub-clusters to one polygon, representing all or a sub-set of said sub-clusters. The fusion functionality may be needed when a splitting step is first applied to improve accuracy, but where reporting of multiple areas or polygons is not supported.

Seven position reporting formats, each associated with a Geographical Area Description (GAD) shape, are supported in 3GPP for LTE, UMTS and GSM. All formats may be used for positioning, although some formats may be more typical for some methods. The seven supported formats are: polygon, ellipsoid arc, ellipsoid point, ellipsoid point with uncertainty circle, ellipsoid point with uncertainty ellipse, ellipsoid point with altitude, ellipsoid point with altitude, and uncertainty ellipsoid. Next, typical formats for different positioning methods are given.

For CID, the cell boundary is typically modeled by a set of non-intersecting polygon segments connecting all the corners of a polygon. For E-CID, the positioning result of CID and TA is typically an ellipsoid arc describing the intersection between a polygon and circle corresponding to the TA. A typical result format of the signal-strength based E-CID positioning is a polygon since the signal strength is subject e.g. to fading effects and therefore often does not scale exactly with the distance. A typical result of AoA and TA positioning is an ellipsoid arc which is an intersection of a sector limited by AoA measurements and a circle from the round trip time like measurements. For RF fingerprinting a typical result format is a polygon. Some vendors also use a point with uncertainty circle, rendering a very low value of the confidence. For AECID a typical result format is a polygon. For TDOA- or TOA-based methods a typical format of a positioning result is an ellipsoid point with or without altitude, and with an uncertainty circle, ellipse, or ellipsoid which is the result of intersection of multiple hyperbolas/hyperbolic arcs (e.g. OTDOA) or circles/arcs (e.g. UTDOA, GNSS, or A-GNSS). For hybrid positioning, the position result may be any shape, since the hybrid technique involves a mix of any of the methods above. However, in many cases a typical format is a polygon or a point with an uncertainty measure. For civic address based positioning the result may be converted to one of the standardized formats for GAD shapes, and is most likely a polygon. Even though some formats may be more specific for some methods, shape conversion may be used to transform a positioning result from one format or shape to another.

A non-limiting aspect of the disclosure relates to methods that enhance the applicability and performance of fingerprinting positioning methods and positioning methods based on CIDs, and in particular that enhance the performance of the AECID fingerprinting positioning method. A number of problems have been identified with conventional solutions:

There is no positioning functionality that exploits restricted location areas of various kinds, such as CSG cells and heterogeneous networks with overlapping structures. With CSG cells in the macro deployment area, different cell reselection rules apply for different users, and the potential location area corresponding to the serving macro cell should be different for users that belong to the CSG and that do not belong to the CSG. It is not possible to take this into account with the conventional positioning solutions, which may make conventional positioning algorithms inaccurate or even failing.

With the current 3GPP positioning formats, there is no method for describing areas where the UE location is unlikely, when the area is a closed area inside the area where the UE location is likely.

There are no algorithms available for handling of areas that partly overlap.

There are no algorithms that allow for excluding or subtracting restricted areas from a positioning result, such as areas inside other areas where users cannot be located, which is a situation that occurs in heterogeneous networks. Algorithms that may handle this within existing reporting standards are not known. As an example, there is no polygon subtraction operation defined for the polygon position reporting format, e.g. in the AECID method.

There is no signaling that enable signaling of location areas where the UE cannot be located. The conventional signaling does not allow for signaling of any area to be subtracted and the behavior of the nodes and devices receiving such information is not defined. Such a possibility would enhance the position reporting and the final accuracy of the received position result. As an example, a coverage area of a cell may be described by a first polygon, with a second polygon inside the first polygon corresponding to an area where the UE cannot be located. The only possibility with the conventional signaling in this example is to signal the first polygon.

There is no standardized signaling available for signaling of multiple areas that overlap partly in existing standards, for example for LTE, UMTS and GSM.

The present disclosure comprises at least the following aspects to address the above and other issues:
- Positioning methods accounting for restricted areas and overlapping areas that occur e.g. for CSG cells and in heterogeneous networks;
- Algorithms that transform two areas, one being in the interior of the other, to a standardized 3GPP reporting format;
- Device, apparatus, and/or system for signaling of multiple, overlapping areas, particularly for the LTE network;
- Device, apparatus, and/or system for signaling of restricted areas as a part of the positioning result;
- Device and node behavior to enable handling of location areas where the UE is not located; and
- Device and node capability that may be exchanged with other nodes or devices or may be signaled on request.

Some details regarding the problems addressed in this disclosure are illustrated by the following three non-limiting examples. There may be situations when more than one of the example situations applies in the same network.

EXAMPLE 1

Figure 2:
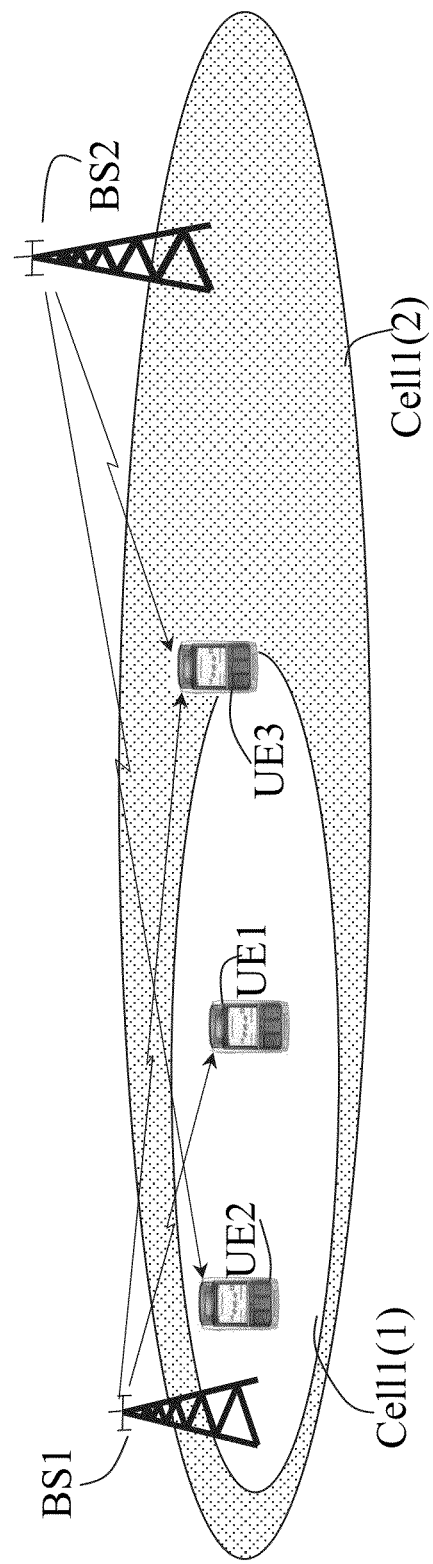
FIG. 2 is a schematic illustration of an example of two overlapping cells.

CSG cells: If the coverage area of a CSG cell is within the coverage area of a macro cell, the coverage area of the CSG cell may or may not be a part of the area associated with the serving macro cell reported based on the cell ID. If it is part of the area depends on whether the UE belongs to the CSG or not. The example is illustrated in FIG. 2, where the cell coverage area shapes are schematically illustrated. Cell1(1) of BS1 is a CSG cell to which UE1 and UE3 are able to reselect, whilst UE2 is not subscribed to the CSG and cannot be served by BS1. UE2 is thus served by BS2 even in the close proximity to BS1. If the coverage area of Cell1(1) is described by a closed geographical area A1, and A2 denotes the coverage area of Cell1(2), A2\A1 is the area of A2, excluding the part overlapping with A1. The positioning result based on the serving cell identity for a UE located within the area A2 may thus be given by one of:
- A1 for UEs that are served by Cell1(1);
- A2\A1 for UEs that are served by Cell1(2) but may also be served by Cell1(1);
- A2 for UEs that are served by Cell1(2) and cannot be served by Cell1(1).

In the above and also further in the disclosure, the sign '\' used between two geographical areas such as A1 and A2 is used to denote area subtraction. A similar situation as the one described above may occur when the radio network infrastructure is shared by multiple operators and not all the radio nodes are available to all operators. As a consequence, not all UEs may be able to access all radio nodes.

EXAMPLE 2

Figure 3A:
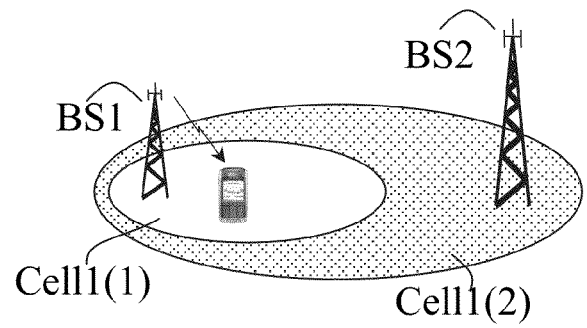
FIGS. 3a-b are schematic illustrations illustrating an example of a cell with an activity that varies over time.
Figure 3B:
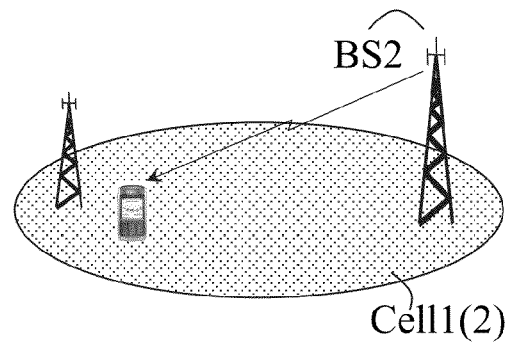

Time-dependent cell coverage: In this second example illustrated in FIG. 3, the activity of some cells varies in time and thus the neighbor cell area description also varies in time, depending on the activity of neighbor cells. The varying activity may in one example mean that some cells are turned ON/OFF during certain times of the day or week when the traffic load in the network is low (e.g. during the close times of a supermarket or a shopping center). The purpose may for example be to save energy. FIG. 3a illustrates that the UE is served by Cell1(1) of BS1 at times when the cell is active, and FIG. 3b illustrates that the UE is served by Cell1(2) of BS2 when BS1 and Cell1(1) is inactive. The serving area of Cell1 (2) is thus different in FIG. 3a and FIG. 3b, depending on whether BS1 is active or not.

EXAMPLE 3

Geographical area with restriction access provided on-line: The flexibility of a positioning system and its ability to learn about the environment and adopt accordingly are very valuable properties that may significantly minimize the network operator's efforts. Areas with restricted access may be configured with the conventional positioning solutions. However, they are typically configured statically and may require a lot of non-automated work and reconfiguration of more than one cell, such as descriptions of the coverage area of multiple neighbor cells, which are tedious tasks often subject to human mistakes.

Several non-limiting examples of areas with restricted access, or in other words areas where the UE location is unlikely, have been given in the previous sections. Such areas are further referred in the current disclosure to as black areas. A black area is thus a predefined geographical area for which a probability that the LCS target is located within the predefined geographical area is below a threshold. In other words, the probability that the LCS target is located within the black area is low. The black area could for example be a geographical area with physically restricted access or with the access restricted in terms of the radio connection, e.g., to a network or a cell. In some embodiments, the term black area may also relate to areas with no or insufficient positioning measurements. How low the probability is may differ for different types of black areas. The probability should typically be around 1% or lower in the case of a physically restricted access area. The probability or the value of the threshold used for determining the probability is not important to reach the object of the disclosure, but is rather just a way to describe the definition of a black area.

In a more general sense, a black area may be defined as a geographical area, in one dimension such as in the vertical domain only, in two dimensions such as in the horizontal domain, or three dimensions such as in the horizontal and vertical domains. In case of a one dimensional area in the vertical domain, a UE would be restricted between a lower and an upper altitude, e.g. between 150 m and 350 m in a cell covering a high building. The two-dimensional case in the horizontal domain, is the "normal" case used for all the figures of the application. The three dimensional domain corresponds to a definition of the black area as a restricted volume, which may be useful in cities where a three-dimensional cell planning is needed, such as in Hong-Kong. The black area may e.g. be a geographical area with:
- A restricted radio access, the restricted access being described by a subscriber group which defines the access rights for a radio node, a certain service, or a certain radio bearer type. CSG cells is one specific example of the restricted radio access;
- A restricted physical access, such as areas where the UEs are not expected to be located, due to e.g. the physical terrain such as mountains or lakes, or due to constructions or public access restrictions;

No or insufficient fingerprint information. If little information is available that means that very few UEs have been in that area. Therefore an area with no or little information may be artificially modeled as a black area. Such an area may also be referred to as an area where an amount of measurements with location information is below a threshold. When such an area is significant in size, there is currently no way to describe it as a cluster. Describing an area with no fingerprinting information as a black area may improve the accuracy of positioning results;

A property that it is describing an overlap of two or more location areas. One example is a handover region, i.e. an overlap of multiple cell areas. This information may be used when it is known that a UE is within a first cell area but does not hear one or more of the other cells, as this implies the exclusion of the cell overlap areas from the first cell area description. Another example is an overlapping area of two or more location areas. An area describing the overlap may be signaled separately to reduce signaling overhead. This is only possible if more than one location area may be signaled. A third example is an overlapping area which may be signaled as a part of one location area and subtracted from another location area, e.g. to reduce signaling overhead or to increase the accuracy of the location information. Also in this case signaling of multiple location areas may be needed.

The black area applicability may be UE-specific, UE-group specific or common for all UEs. As an example a cell description with physical access restriction is common for all UEs in the area. The applicability may also be conditional, e.g. only applicable when a UE is served by a cell overlapping with the black area. Furthermore, it may be time-dependent, e.g. depending on the activity of some cells as described in Example 2 above. In this case a certain time may be viewed as another condition.

A black area may be associated with another geographical area or cell. The association may be done via e.g. tracking area identification. In one example, the black area is associated with one or more cells with which it has at least partial overlap. Another possibility is that the black area is associated with the serving cell of a UE.

In embodiments, an LCS server, which may be a positioning node, obtains information relating to a first predefined geographical area which is a black area, and then uses this information when performing positioning of an LCS target, which may be a UE.

The information relating to a black area may be obtained in different ways. In one embodiment it may be provided to the LCS server manually, by an information storage device, by a software program, or by input via a graphical interface. In another embodiment it may be signaled, either together with (i.e. in the same message) or without another geographical area or cell to which the black area is associated. In still another embodiment it may be signaled either with (i.e. in the same message) or without an intermediate positioning result. The intermediate positioning result may be a geographical area from which the black area has not yet been subtracted. Any of the embodiments for obtaining the information relating to black areas may be combined with each other.

In a further embodiment, the black area information may be stored in a memory or a database e.g. in the UE or in the positioning node, and then retrieved from the database when a positioning of the UE is requested.

The information relating to the black areas may in embodiments be used to modify the description of other areas, such as the areas with open access or cell area descriptions, which do not necessarily represent positioning results. This may be done statically, semi-statically or dynamically.

The information may also, or alternatively, be used to adjust the positioning result by excluding the black areas. A specific example of the positioning result is one or more of an AECID result, a CID result, an E-CID result, and a hybrid positioning method result. The adjustment of the positioning result may e.g. be done in the LCS server, in the LCS target, or in the LCS Client, e.g. the PSAP, depending on where the black area information is available.

To enable the using of black areas for positioning, at least one of the following is defined:

Black area modeling and presentation formats;

Signaling means and interfaces;

Nodes behavior for interpreting the black area information. As an example, a new LCS target or LCS Client behavior is needed to correctly interpret the received black area information, i.e. as the area where the LCS target may not be located;

Applicability rules and triggers associated with black areas;

Methods for operating black areas, such as methods for the area subtraction operation, which may be used for adjusting positioning results.

Black area modeling and formats: In principle, a black area may be described in a way similar to that used for describing a UE location area. In one embodiment, a black area may be described by means of any of the conventional position reporting formats, e.g. GAD shapes. In a specific example, a black area may be described by a polygon. There is no standardized way for describing a location area with multiple GAD shapes. A similar approach, i.e. describing an area with two or more not necessarily the same GAD shapes, may also be adapted in one embodiment of the current disclosure for describing a black area. A black area may also be described with a civic address or its part (example: "6th floor").

The format of the black area description may or may not be the same as the format of the associated area. The black area information may also comprise uncertainty and a confidence level. In one embodiment, when signaled together with an associated area or a positioning result, the black area has the same confidence level as the associated area and the positioning result.

In one embodiment, the black area information is modeled and presented separately from other area(s), e.g. as described above. To enable explicit signaling of the black area information, new signaling is proposed. There are also methods of incorporating the black area information that allow avoiding explicit signaling of black areas. Two such methods are described below. The first method, the extended boundary method, may be used with the currently standardized signaling, but have some limitations. The second method, the area splitting method, relies on the possibility of signaling multiple GAD shapes for a single location area. The two methods are described for an inner black area scenario, but adapting them to a scenario with the black area partially overlapping with the associated area is straightforward and is thus not further described.

Method 1. The extended boundary method for describing an inner area with restricted access: The method disclosed in this section enables accounting for an inner black area using the currently standardized positioning formats and produces a single extended boundary of an area out of the two boundaries which are the outer boundary of the location area and the boundary of the black area with restricted access. The method does not require new signaling and does not require any extensive implementation. This may be a good solution for the cases when the standard formats are not limiting, such as a case when the maximum number of vertexes of a resulting polygon does not exceed 15. 15 vertexes is the limit in the current standard.

Figure 4A:
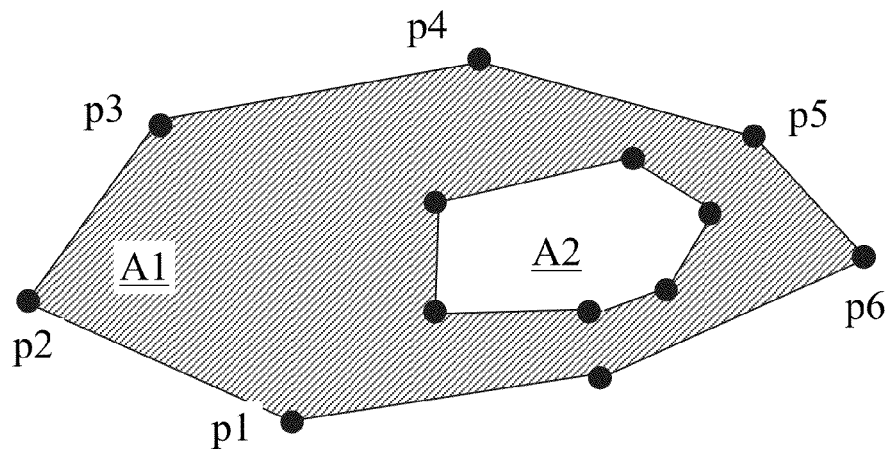
FIG. 4a is a schematic illustration of two overlapping areas described as polygons.
Figure 4B:
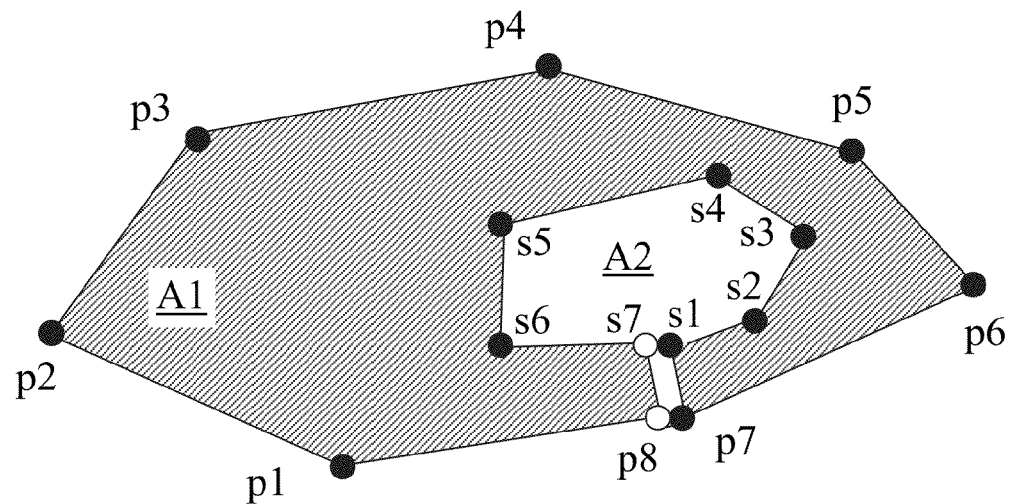
FIGS. 4b-d are schematic illustrations of some examples of how to describe the areas.

An outer boundary of the area A1 where the UE may be located, e.g. based on the cell ID, is described by a first geometrical shape. A boundary of an inner area denoted A2 where the UE may not be located, i.e. the black area, is described by a second geometrical shape. A non-limiting example where the first and the second shapes are polygons is illustrated in FIG. 4a. In the FIG. 4a, the boundary of A1 may be given e.g. by a sequence of points <p1, p2, p3, p4, p5, p6, p7>. The method 1 comprises the following steps:

1. Define additional vertex(es) for A2. If the boundary of A2 contains at least one vertex (e.g. being described by a polygon), add an additional vertex close to an existing vertex of the said boundary of A2. If the boundary of A2 contains no vertexes (e.g. being described by an ellipse), add two additional vertexes close to each other on the said boundary of A2. It may differ how close the vertexes should be, depending on the size of the areas e.g.
2. Define additional vertex(es) for A1. If the boundary of A1 contains at least one vertex (e.g. being described by a polygon), add an additional vertex close to a vertex of the said boundary of A1. If the boundary of A1 contains no vertexes (e.g. being described by an ellipse), add two additional vertexes close to each other on the said boundary of A1.
3. Two vertexes close to each other are now available for A1 and another two vertexes close to each other are available for A2. Connect one of the additional vertexes of A1 to one of the additional vertexes of A2, and connect the second of the additional vertexes of A1 to the second of the additional vertexes of A2, e.g. with two non-intersecting lines as illustrated in FIG. 4b.
4. The area where the UE may be located may now be described by a boundary extended to include both the boundary of A1 and the boundary of A2. In FIG. 4b, the extended boundary may be given e.g. by the sequence of vertexes <p1, p2, p3, p4, p5, p6, p7, s1, s2, s3, s4, s5, s6, s7, p8>.

Variations of this algorithm may also be envisioned, e.g. no additional vertexes (such as p8 and s7 in FIG. 4b) may be added, but instead the two boundary area may be just connected to each other. Using the notation in FIG. 4b, the extended boundary may be given in this case by the sequence of vertexes <p1, p2, p3, p4, p5, p6, p7, s1, s2, s3, s4, s5, s6, s1, p7>. This is a possible solution, although some conventional algorithms may not be able to correctly deal with repeating edges in a polygon shape.

Another slight variation of the algorithm may be envisioned e.g. for a case when the boundary of A1 and the boundary of A2 have at least one common vertex, but since extending the algorithm for such cases is straightforward, it is not described further.

Figure 4C:
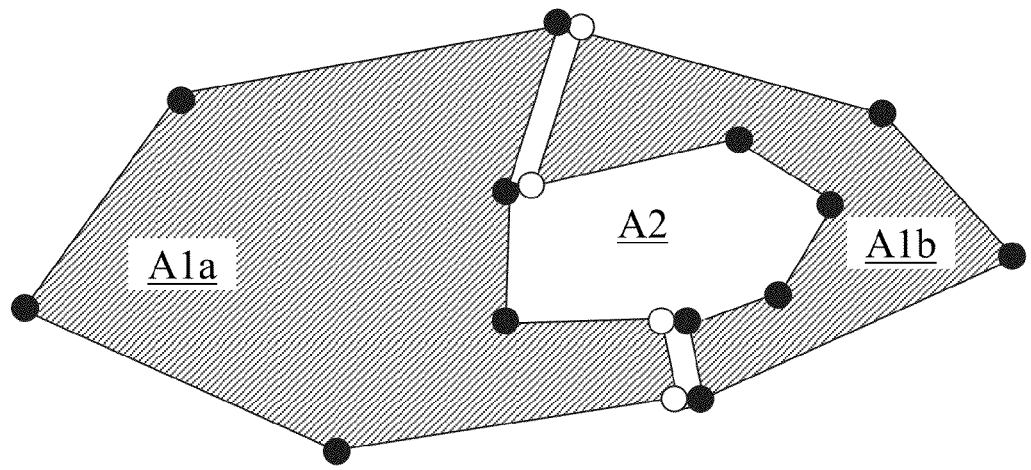
Figure 4D:
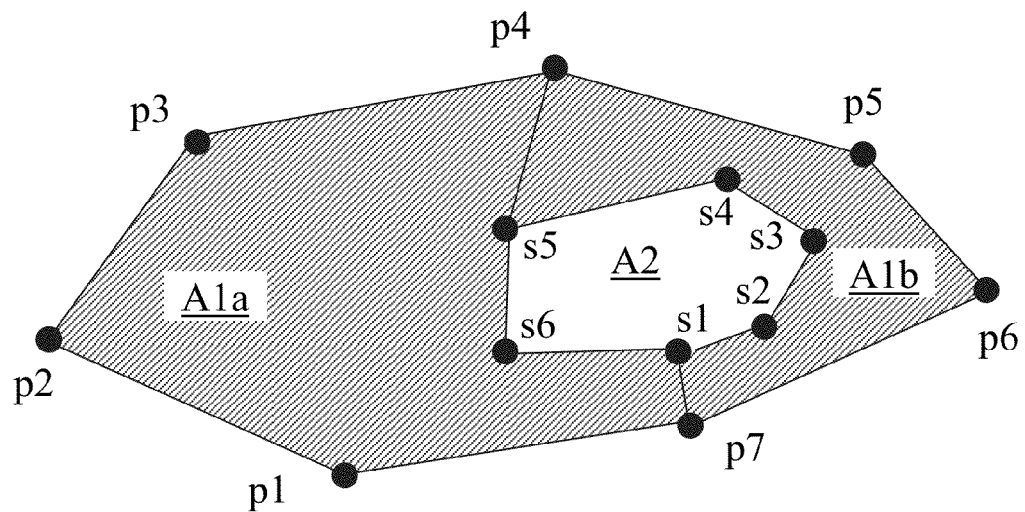

Method 2. The area splitting method to enable describing an inner area with restricted access: Unlike the extended boundary method, the method described in this section relies on a possibility to describe an area with multiple shapes but allows avoiding the format limitation (e.g. the limit of maximum 15 vertexes). The idea of this method is that when an inner area with restricted access is identified, the area surrounding the said inner area is split into at least two areas. The method comprises connecting the boundaries of the two areas in two or more places such that area A1 splits into two or more shapes. The connecting may be implemented with or without adding extra vertexes as e.g. illustrated in FIGS. 4c and 4d, respectively. In FIG. 4c, the boundaries of the new areas may be given by the two corresponding sequences of vertexes: <p1, p2, p3, p4, s5, s6, s1, p7> and <s1, s2, s3, s4, s5, p4, p5, p6, p7>. If the standard would allow signaling of multiple shapes, these two polygons could further be signaled e.g. to the LCS target/UE or the LCS Client.

Signaling means and interfaces: The disclosed signaling comprises:

Signaling of the black area information. Some signaling method alternatives are disclosed below. The black area information comprises at least a description of a geographical area corresponding to the black area. The black area information may also include the uncertainty and the confidence information. The black area description may follow the formats discussed above, and may e.g. be described as a polygon. In the following list, the signaling is via direct links, via higher layer protocols, and/or via one or more network nodes. For the signaling between E-SMLC and PSAP, the positioning result is transferred via multiple nodes e.g. The black area information may in embodiments be signaled between:

The LCS server and the LCS target in general, e.g. via the LPP. The two nodes may be any of a wireless device, a network node or a radio node.

The LCS server and the LCS Client (e.g., between E-SMLC and PSAP, between SLP and External LCS Client, between E-SMLC and eNodeB, or between E-SMLC and UE).

The positioning node (e.g., E-SMLC or SLP) and other network node (e.g., MME/MSC/GMLC/O&M/SON/home eNodeB), The positioning node and a radio node, where the radio node is e.g., an eNodeB or a beacon device. The signaling may in this case be via LPPa.

The user plane positioning node (e.g., SLP in LTE or other RAN) and the control plane positioning node (e.g., E-SCML in LTE).

Different radio nodes (e.g., between different eNodeBs, between different Location Measurement Units (LMU), between eNodeB and LMU).

Radio network nodes and radio nodes (e.g. between Radio Network Controller (RNC) and NodeB in WCDMA).

UE and radio node, e.g., via a RRC protocol.

Signaling of the capability of handling black areas. In the above, it is assumed that the involved nodes or devices (e.g., a UE) also get a capability of dealing with the enhanced location area description. Such a capability implies support of the corresponding interface that enables the described signaling and may also imply a certain behavior (e.g. interpreting the black area information differently from the conventional location area information, e.g. as the area where the LCS target is not located). This capability may be optional and the capability information may be exchanged or sent upon a request from other nodes (e.g. LCS server which may be E-SMLC in LTE) or devices. Similarly, the LCS server may also have a formal capability of dealing with restricted areas, in addition to the conventional functionality.

Signaling of the positioning result adjusted to account for the black area information. This section implies no explicit signaling of the black area information, but rather the result of accounting for it, e.g., after applying the extended boundary method 1, or the area splitting method 2 described in this disclosure. The signaling means may thus be the same as for signaling of a positioning result without accounting the black area information.

Signaling of the information enabling the applicability rules and triggers associated with black areas. The positioning node needs to be made aware of the UE ability to access or get served in certain areas or in certain cells. In one embodiment, the ability is the UE subscription information (e.g. to a certain CSG). Alternatively, the information may be received by the positioning node (with or without a request from the positioning node) e.g. from the UE (the UE sends an indicator over LPP), from another network node (from MME together with the positioning request sent from MME to the positioning node or in response to a request message sent by the positioning node to MME; or from a femto gateway or from GMLC, a Home Location Register (HLR), or a Home Subscriber Service (HSS)), or from a radio network node (e.g., from eNodeB in LTE via LPPa or from RNC in WCDMA). Another alternative is that the positioning node may request the UE subscription information e.g. when there are CSG cells in the potential location area. The positioning node needs also to be made aware of the radio nodes activity. In one embodiment, a radio node (e.g. eNodeBs or home eNodeBs) notifies the positioning node about its activity/inactivity (e.g. via an indicator sent via LPPa protocol). This may serve as an indicator to the positioning node about e.g. which cell area descriptions in the area shall apply when cell ID-based positioning is used. In another embodiment, the positioning node is provided the activity information by another network node (e.g. SON or O&M node).

Methods of Signaling the Black Area Information

The disclosed subject matter is not limited to the example alternatives described hereinafter:

Signaling Alternative 1: The current alternative comprises signaling of at least two types of positioning results, where the first positioning result is one or more of a conventional positioning result and at least one of the second positioning results describes at least one black area, any format may be used for a second positioning result, and the format may not necessarily be the same for the first positioning result and the second positioning results, and may not necessarily be the same for all of the second positioning results. In one embodiment, at least one of the second positioning results is described by a polygon. In another embodiment, all first positioning results are signaled as one structure, and all second positioning results are signaled as another structure in the same message, as in the following example:
positioningResults={positioningResult1, positioningResult2, ... }
blackAreaResults={blackAreaResult1, blackAreaResult2, ... }

In another embodiment, the structure applies only to the black area information, as in the following example:
positioningResult
blackAreaResults={blackAreaResult1, blackAreaResult2, ... }

In yet another embodiment, only one black area may be signaled in one message, as in the following example:
positioningResult
blackAreaResult In yet another embodiment, multiple positioning results may be allowed in the same message and the same information element may be used for the first positioning results and the second positioning results. An indicator may be used to indicate whether a positioning result describes a black area or not. The indicator may be an optional Boolean indicator signaled with value 'True' for each of the second positioning result. For example:
positioningResult
positioningResult, blackArea=true Signaling of the black area information may be directed to one or more destinations. The broadcast/multicast of this information may be e.g. via RRC signaling directed to two or more UEs in the coverage area of the cell, or via LPP. With multicast signaling, a condition may be used in the signaling node, which may be the positioning server or the radio node, to select a subset of receiving devices or nodes. In another embodiment, a condition indicating when the signaled second positioning result shall be interpreted as a black area may also be signaled together the second positioning result. For example:
blackAreaResult, blackAreaCondition=(UE does not belong to CSG <CSG>)

The advantage with signaling the condition is that the information may be signaled, without association with a specific wireless device, to more than one wireless device or to another network node (e.g., radio BS or another positioning node or MME), which then may use the black area information selectively, applying the condition.

Signaling Alternative 2: The embodiments in this alternative cover signaling of a positioning result and its overlap with at least one black area. The embodiments described for Signaling Alternative 1 apply also in this section with second positioning results being overlap areas with the corresponding first positioning results. The number of second positioning results shall either be the same as the number of first positioning results in the same message, or the relation between the first and second positioning results shall be clearly defined, e.g., by indexes or separate structures for each combination of the first result and the corresponding second positioning result if any. Alternatively the number of first positioning results shall be one.

Signaling Alternative 3: The embodiments in this alternative 3 cover signaling of black area information separately from the first positioning result. The embodiments described for Signaling Alternative 1 apply also in this section with the set of first positioning results being empty. In some embodiments, there may be no need to indicate whether this is the information related to black areas or not since there is no first positioning results in the same message and thus no need to distinguish. However, it then needs to be known to the receiving side that the message contains only the black area information.

Signaling Alternative 4: Vector graphics may be used for signaling the black area information or the positioning result after accounting for the black area information, which makes it possible to avoid the position reporting format constraints in the current standard. Vector graphics is a standardized way of signaling and displaying simple graphics, like geometrical geographical shapes, within a short message service format.

Hereinafter, the method for building up the black area information database and for utilizing the black information for positioning is described according to embodiments. The described steps are an example algorithm flow, and variations such as excluding or making optional some of the steps, changing the order of the steps, or performing some steps more often than other steps may be envisioned. Steps 1 and 2 below may e.g. be performed only when new data is available, whilst Step 6 may be performed within a positioning session.

1. Build up a geographical database of coverage area descriptions, while allowing for storing high-precision positions with fingerprints describing black areas, e.g., for CSG cells, and/or geographical areas describing black areas without fingerprints, e.g., by entering manually a geographically restricted area or collecting high-precision positions along the perimeter of the restricted area. This is done such that the system is capable of extracting the black area information on demand, which may be e.g. user-dependent and/or time-frequency dependent. Black area clusters describing areas with no or insufficient fingerprints may also be created and stored or created dynamically specifically for a certain area.

2. Build black area clusters of high precision positions. In one embodiment, the black area cluster boundaries (typically polygons) are obtained for a given confidence level, where the interpretation of the confidence level may be the same as for GAD shapes, including polygon, used in the AECID positioning method.

3. The black area information may be exchanged among the nodes statically, semi-statically or dynamically, e.g. between radio nodes such as eNodeBs, between the positioning node and a radio node, between the positioning node and other network nodes such as O&M nodes or MME, or between positioning nodes, e.g., between SLP and E-SMLC.

4. Associate at least one location area with at least one black area e.g. by means of tagging such as adding a cell ID of the associated cell. For each black area an associated area is found and is assigned the corresponding tag. An associated area may be the area described by a cluster or cluster boundary intersecting, i.e. having a non-empty overlapping area, excluding the cluster boundary, with the cluster describing the black area. The intersection may be found by a conventional algorithm and may be obtained statically and stored in the internal or external memory. It may also be obtained dynamically.

5. For a given associated location area, execute at least one of extraction of at least one black area (e.g. using the tag) and find the overlap (if not yet known), and extraction of the overlap of the associated location area with at least one black area.

6. When the handling of black areas is enabled or triggered (e.g. a certain location area is associated with one or more black areas corresponding to CSG cells and the location area is a serving macro cell of a UE being positioned), either of the following may occur:
   a. The positioning result may be adjusted in a network node (e.g. the positioning node) to account for at least one black area, where the positioning result may further be signaled to a wireless device, an LCS Client, another network node, or a radio node;
   b. The positioning result before subtracting the black areas and the black area information are signaled (refer to Signaling Alternatives 1 and 4 for more details) to at least the positioning target or the LCS Client, so that the receiving side may use the obtained black area information to adjust the positioning result;
   c. The positioning result and its overlap with at least one black area are signaled (refer to Signaling Alternatives 2 and 4 for more details) to at least the positioning target or the LCS Client, so that the receiving side may use the obtained black area information to adjust the positioning result;
   d. The black area information is signaled (refer to Signaling Alternatives 3 and 4 for more details) by a network or radio node to a UE, so that the UE may use the obtained black area information to adjust the positioning result obtained by the UE (e.g. in UE-based positioning).

7. The adjustment of a positioning result to account for a black area comprises subtracting the black area from the location area, where the subtracting may be e.g. implemented using the subtracting algorithm described in this disclosure. The adjusted positioning result is further used for positioning the LCS target.

Shape conversion may also be applied, e.g. prior to signaling the positioning result. Shape conversion is a transformation between geographical positioning formats that usually cause a loss of accuracy. In one embodiment, the available black area information is accounted for in shape conversions. In a separate embodiment, shape conversion may be applied separately but consistently to the location area and black area. In another embodiment, shape conversion is applied to the result of subtracting the black area. The shape conversion may, for example, be used in Step 6a, e.g. in E-SMLC prior signaling to the LCS Client or LCS target.

In the following section, an example subtracting algorithm for adjustment of a location area accounting for a black area is disclosed. The algorithm may be applied at any node or device that may obtain a first positioning result and a second positioning result. The algorithm is described for two areas, but extending the functionality for handling multiple areas (an overlap of multiple areas or subtracting the overlap from multiple areas) is straightforward.

1. Acquire a first positioning result (area A1). The way of acquiring depends on the node implementing these steps, e.g. may be received via signaling or acquired from a database or memory or delivered by another functional block.

2. Acquire a second positioning result (area A2), which may potentially overlap with the said first positioning result, selected e.g. by the tag corresponding to the first positioning result. The way of acquiring depends on the node implementing these steps, e.g. may be received via signaling or acquired from a database or memory or delivered by another functional block.

3. Find the adjusted positioning result, further referred to as the third positioning result, using the following steps.
   a. Find the overlap area of the said first positioning result and the second positioning result, i.e. A1∩A2 where ∩ means intersection. Any conventional overlap detection algorithm may be used. In some described embodiments the overlap is given, e.g. via signaling, and this Step 3a may be skipped.
   b. Find the third positioning result, i.e. A1\(A1∩A2). The third positioning result may also be delivered by one of the two area subtraction algorithms described below.

4. The adjusted positioning result may further be fitted/converted into one of the pre-defined formats, e.g. if it is to be signaled to the positioning target or other node and the allowed signaling format allows for signaling the obtained third result (see Section 3.2.1 and Section 3.2.2 for more details).

Area Subtraction Algorithms

The following situations may occur:
a) The second positioning result is fully covered by the first positioning result, A1∩A2=A2. If the intersection of A1 and A2 equals A2, then A1 must at last cover A2, i.e. A1 includes A2 and possible more.
b) The first and the second positioning result partially overlap, i.e. (A1∩A2)⊂A2 and (A1∩A2)⊂A1. In this case the intersection of A1 and A2 are contained both in A1 and A2, hence the intersection is an overlap.
c) The first and the second positioning result do not overlap (the overlap area is empty, i.e. A1∩A2=∅);
d) The first positioning result is fully covered by the second positioning result, A1∩A2=A1.

The subtraction algorithms described further in this section find out which situation applies and return the result of A1\(A1∩A2) when relevant. The result is non-empty set in the situations a, b and c described above.

When the situation d occurs, the result is an empty set, which may happen, e.g. for the following reasons in the case of fingerprinting positioning such as AECID positioning:
The clusters are typically built for a confidence level below 100%, so some positions may still occur beyond the created cluster boundaries e.g. due to fading effects;
The database is corrupt or outdated (e.g., due to cell reconfiguration such as changed antenna configuration comprising tilt, azimuth and/or height, newly introduced sites, changed maximum BS transmit power, new constructions that impacts signal propagation paths, etc.).
The database is not yet fully populated.

When the situation d occurs, the positioning system may take one or more of the following actions:
Report a positioning result as the area of A1 or a larger area of A1 corresponding to a higher confidence level (preferred solution), or A2 as a positioning result (since the UE location is even beyond the A2 area), or a positioning failure;
Trigger a more accurate positioning method (e.g. OTDOA)—preferred solution when more positioning attempts are acceptable;
Collect the occurrence statistics of such cases (e.g. by cell IDs, or cluster tags);
Increase the confidence level when creating cluster boundaries, when the rate of occurrences of such cases is above a threshold;
Indicate the need and/or trigger clean up, update or rebuild of the fingerprint or cluster database or its part(s) when the rate of occurrences of such cases is above a threshold;
Trigger collecting measurements in the area, e.g. by configuring one or mode network nodes or devices reporting measurements with the location information e.g. for the purpose of minimizing drive tests or for the purpose of populating the fingerprinting database if such a possibility exists.

Example subtraction algorithm 1: It is assumed that the cluster of measurements corresponding to A1 is available and the boundary of area A2 is available. This may be the case, e.g., when the intersection detection is performed in the positioning server. In case when only the boundary of A1, but not the cluster of measurements, is available, an artificial cluster of interior may be created in order to make the algorithm applicable. The output is the boolean isOverlapping and the result of A1\(A1∩A2) when isOverlapping=true. Steps 1 and 2 are executed once per each black area A2 if multiple black areas are present.
1. Identify a subset of clustered points inside A1 that are also inside or at the boundary of A2. For example, a check for each of the points of A1 may be performed to find out whether the point is inside A2. The check procedure may be implemented e.g. as a standard test ray technique. If the subset is empty, set isOverlapping=false and return the result (e.g. A1\(A1∩A2)=A1\∅=A1), otherwise set isOverlapping=true and proceed to the next step.
2. Virtually remove, e.g. by marking, from A1 all the points that are in the subset, i.e. covered by A2.
3. For a given confidence level, rebuild the cluster descriptor(s) of A1 with the said virtually removed points excluded. The third positioning result is given by the result of this operation.

Figure 4E:
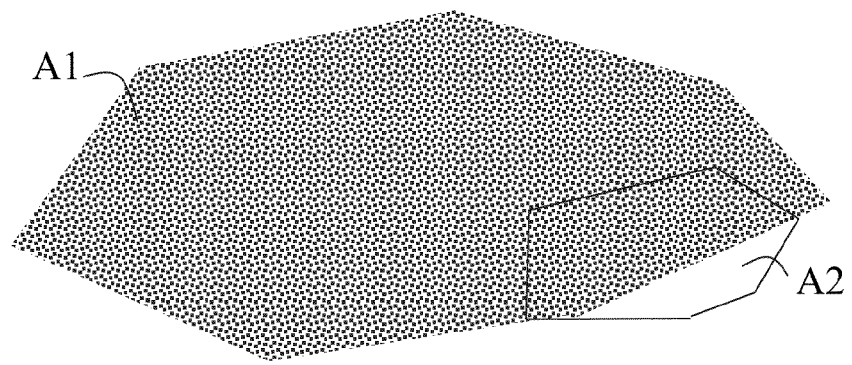
FIGS. 4e-f are schematic illustrations of some examples of area subtraction algorithms.

The example A1 cluster, A2 boundary and the result of virtual removing of A1 measurement points inside of A2 are illustrated in FIG. 4e.

Figure 4F:
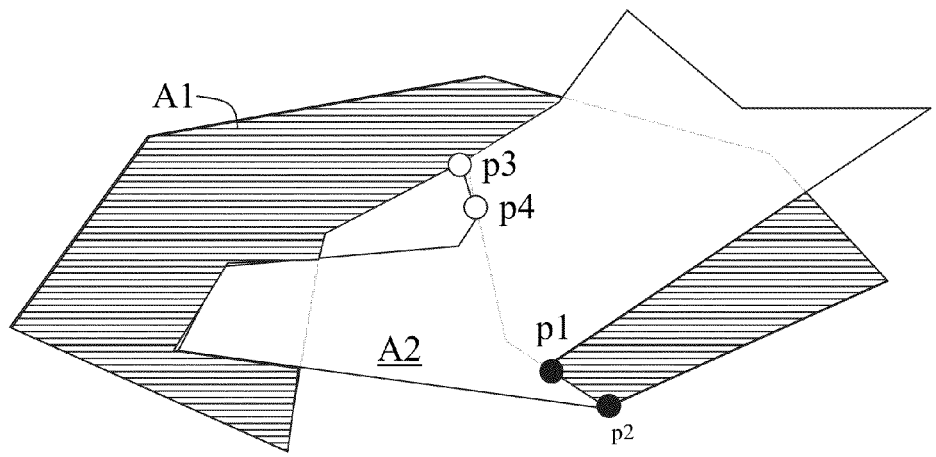

Example subtraction algorithm 2: It is assumed that the boundaries of both A1 and A2 are available. This may be the case, e.g., when the algorithm is executed in the positioning server or the first and the second positioning results are signaled to the positioning target or the LCS Client. If no boundary is available, but only cluster(s) of measurements, then the algorithm described in this section is preceded by creating the cluster boundaries, e.g. by conventional polygon building algorithms used in AECID. The output is the boolean isOverlapping and the result of A1\(A1∩A2) when isOverlapping=true. Steps 1-2 are executed once per each black area A2, if multiple black areas A2 are given as input.
1. Find the overlap of A1 and A2, i.e. the result of A1∩A2. This may be done e.g. by a conventional algorithm such as a test ray technique. If the result is an empty set isOverlapping=false, otherwise set isOverlapping=true.
2. If the result of A1∩A2 is trivial, e.g. it is an empty set or A1, the boundary of the third positioning result is given by A1 or the empty set, respectively. If the intersection result is A2 or a part of A2, the new boundary of the third positioning result has to be found, where the new boundary shall satisfy the following rules:
   a. The boundary of the third positioning result consists of the boundary of A1, except the A1 boundary parts that are strictly inside A2, and
   b. The boundary of the third positioning result contains the parts of the A2 boundary which are strictly inside A1, and
   c. The parts of the A1 boundary that touch from outside the A2 boundary. See e.g. the line between points p1 and p2 in FIG. 4f, where the result area A1\(A1∩A2) is the area with stripes.

From the three rules above it automatically follows that the parts of the A1 boundary that touch the A2 boundary (see e.g. the line between points p3 and p4 in FIG. 4f) from the inside are not included in the boundary of the third positioning result. The extended boundary method and the area splitting methods, both described in the current disclosure, may be applied to the third positioning result, e.g. when A1∩A2=A2. It should also be noted that the outer boundary of the third positioning result may comprise multiple disjoint areas, e.g. as in FIG. 4f, even if the outer boundary of A1 comprises one area. If necessary, a polygon fusion algorithm may therefore be applied to the obtained third positioning result, e.g., when the signaling of multiple shapes is not supported.

In one exemplary embodiment, a geographical area with restricted access is provided to the positioning node, e.g. via a graphical interface. The positioning node then converts the marked geographical area to an area described following the format and coordinates, and the positioning node uses this information to update its database with area descriptions.

In another exemplary embodiment, the description of, or the information about the areas with restricted access that is stored in the database may be used to dynamically create or adjust the areas of interest, e.g. by excluding the areas with restricted access from certain clusters. The stored description of areas with restricted access may also be signaled to or exchanged with other nodes or devices. Alternatively, the information stored in a database or some memory, may also be used to update the stored description of other areas.

In a further embodiment, certain areas may have restricted public access and thus may potentially be excluded for commercial positioning services. However, such areas may still be used as areas of potential UE location for some specific services, e.g. emergency positioning or security positioning service, or for a certain group of UEs having the access to these areas.

Figure 5A:
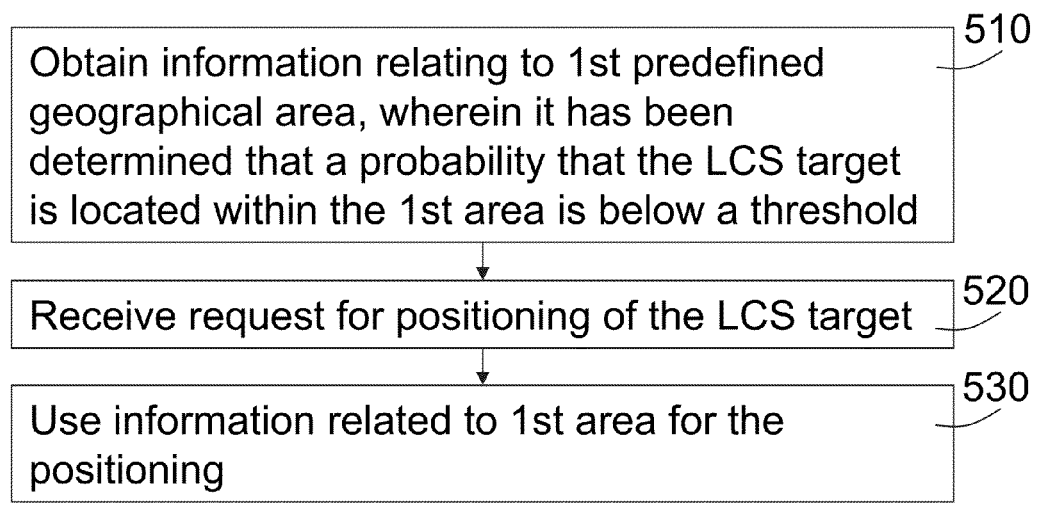
FIGS. 5a-c are flowcharts of the method in the LCS server according to embodiments.

FIG. 5a is a flowchart of a method in an LCS server of a wireless communication system, for positioning of an LCS target, according to an embodiment. In one embodiment the positioning is based on an adaptive enhanced cell identity method. However, other positioning methods may also be used. The method comprises:

510: Obtaining information relating to a first predefined geographical area, wherein it has been determined that a probability that the LCS target is located within the first predefined geographical area is below a threshold. The first geographical area is thus a black area. Obtaining the information may in one embodiment comprise receiving the information from a network node. However, the information may also be provided to the LCS server manually, by an information storage device, by a software program, or by input via a graphical interface.

520: Receiving a request for a positioning of the LCS target.

530: Using the obtained information relating to the first predefined geographical area for the positioning of the LCS target.

In one embodiment, the method further comprises storing the obtained information relating to the first predefined geographical area in a database, and retrieving the stored information based on the received request. The database may e.g. be in the LCS server.

The information relating to the first predefined geographical area may in embodiments comprise at least one of the following: a first predefined geographical area description; a second geographical area description associated with the first predefined geographical area; and a condition for when the first predefined geographical area is applicable. The second geographical area may for example be a cell associated with the black area. The first predefined geographical area description may in one embodiment be a cluster of measurements with location information for LCS targets. Alternatively, the first predefined geographical area description may be a polygon determined based on the cluster of measurements with location information for LCS targets. The condition for when the first predefined geographical area is applicable may be that a time condition is fulfilled, or it may be that the LCS target corresponds to a specified LCS target. The example 2 described above with reference to FIG. 3a, is an example of when a black area is applicable when a certain time condition is fulfilled. The example 3 of the CSG cell described with reference to FIG. 2, is an example where the black area is applicable only when the LCS target is a specific target, i.e. a UE which has access to the CSG cell.

In embodiments, the first predefined geographical area is at least one of the following: a physically restricted area; a radio access restricted area; an area where an amount of measurements with location information is below a further threshold; and an area describing an overlap of two or more location areas.

Figure 5B:
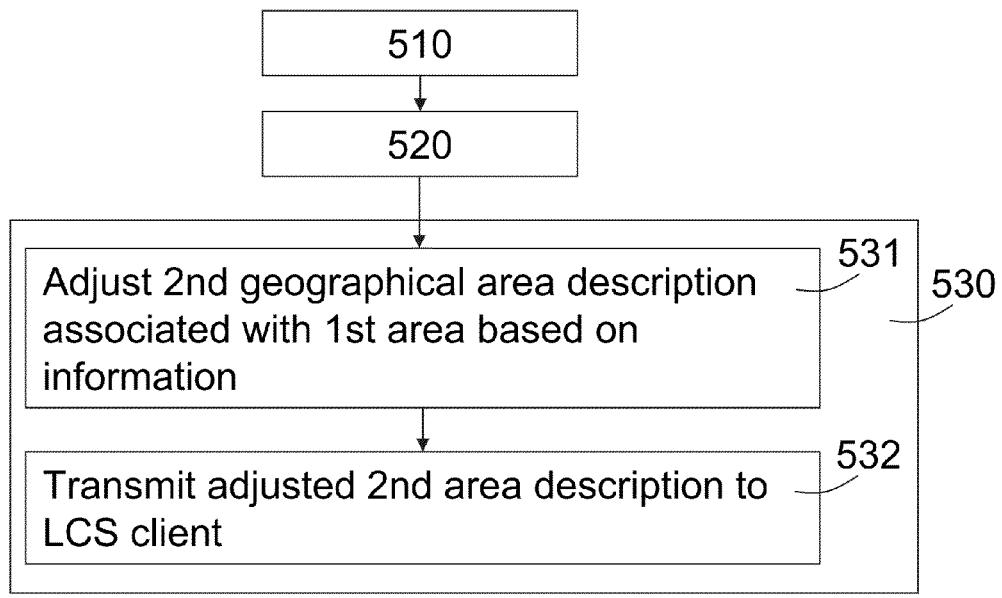
Figure 5C:
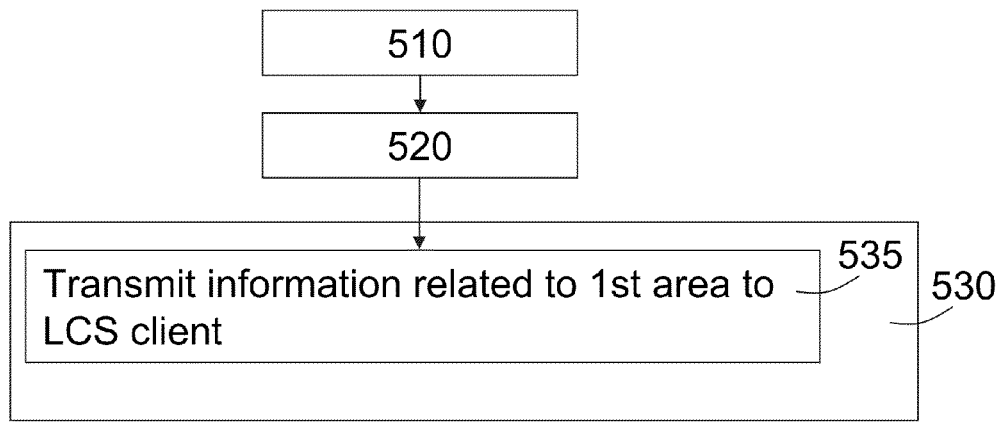

FIG. 5b-c are flowcharts of the method in the LCS server according to embodiments A and B, where the step of using 530 the obtained information relating to the first predefined geographical area for the positioning of the LCS target is further detailed. In embodiment A of FIG. 5b, using 530 the information relating to the first predefined geographical area comprises adjusting 531 a second geographical area description associated with the first predefined geographical area based on the information relating to the first predefined geographical area, and transmitting 532 the adjusted second geographical area description to an LCS client interacting with the LCS server for the positioning of the LCS target. The LCS server may thus use the black area information by adjusting a description of a cell associated with the black area, or adjusting an intermediate positioning result, and then transmit the adjusted area to the LCS client. Alternatively, the LCS server adjusts the second geographical area, which may be retrieved from the database described above with reference to FIG. 5a, and stores the adjusted geographical area description in the database. In these embodiments, the adjusting 531 may comprise excluding a first predefined geographical area description comprised in the information relating to the first predefined geographical area from the second geographical area description. This may e.g. be done with the region subtraction algorithms described previously in the disclosure. Alternatively, the adjusting 531 may comprise connecting a boundary of a first predefined geographical area description comprised in the information relating to the first predefined geographical area with a boundary of the second geographical area description to form an extended boundary comprising both of said boundaries, the extended boundary describing at least one area excluding the first predefined geographical area. An example of this embodiment is described above in Method 1—the extended boundary method.

In FIG. 5b illustrating the flowchart of the method according to embodiment B, using 530 the information relating to the first predefined geographical area comprises transmitting 535 the information relating to the first predefined geographical area to an LCS client interacting with the LCS server for the positioning of the LCS target. The LCS server may thus in this embodiment B transmit both the black area information and an associated cell or an intermediate positioning result to the LCS client so that the client may make the adjustment needed instead. In one embodiment, the transmitted information relating to the first predefined geographical area comprises an indicator indicating whether a geographical area description in the transmitted information is a first predefined geographical area description. This is to enable the LCS client to identify if the received information is a black area or not.

Figure 6A:
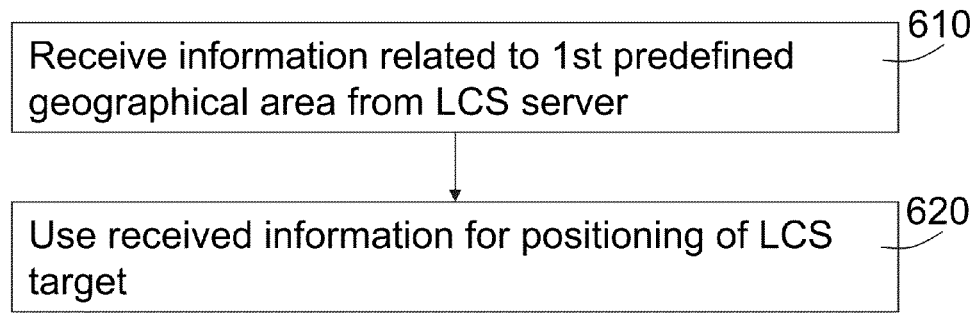
FIGS. 6a-b are flowcharts of the method in the LCS client according to embodiments.

FIG. 6a is a flowchart of a method in an LCS client of a wireless communication system for positioning of an LCS target. The LCS client may in one embodiment be co-located with the LCS target. The positioning is managed by an LCS server interacting with the LCS client for the positioning of the LCS target. The method comprises:

610: Receiving information relating to a first predefined geographical area from the LCS server, wherein it has been determined that a probability that the LCS target is located within the first predefined geographical area is below a threshold.

620: Using the received information for the positioning of the LCS target

This is thus the method in the LCS client corresponding to embodiment B described above for the method in the LCS server. The information relating to the first predefined geographical area may comprise at least one of the following: a first predefined geographical area description; a second geographical area description associated with the first predefined geographical area; and a condition for when the first predefined geographical area is applicable. The first predefined geographical area description may be a cluster of measurements with location information for LCS targets. The first predefined geographical area description may alternatively be a polygon determined based on the cluster of measurements with location information for LCS targets. The condition for when the first predefined geographical area is applicable may be that a time condition is fulfilled, or that the LCS target corresponds to a specified LCS target. Furthermore, the first predefined geographical area may be at least one of the following: a physically restricted area; a radio access restricted area; an area where an amount of measurements with location information is below a further threshold; and an area describing an overlap of two or more location areas.

Figure 6B:
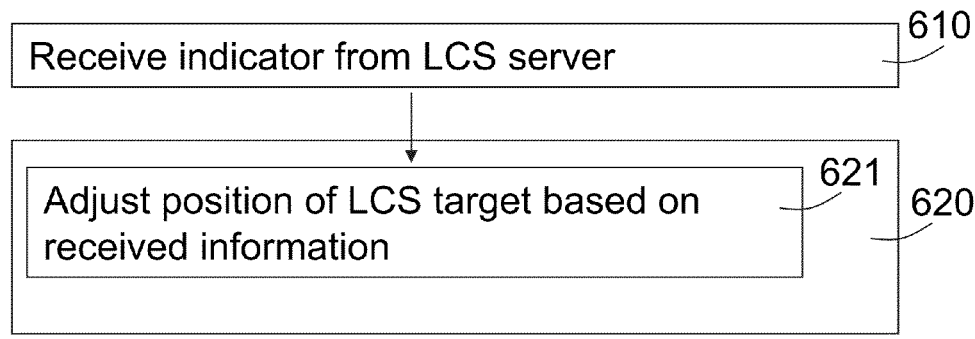

FIG. 6b is a flowchart of the method in the LCS client according to embodiment B, where the step of using 620 the received information for the positioning of the LCS target is further detailed. The received information comprises an indicator indicating whether a geographical area description in the received information is a first predefined geographical area description, and using 620 the received information comprises adjusting 621 a position of the LCS target based on the received information. The indicator makes it possible to differentiate between black area descriptions and other area descriptions received from the LCS server.

Figure 7A:
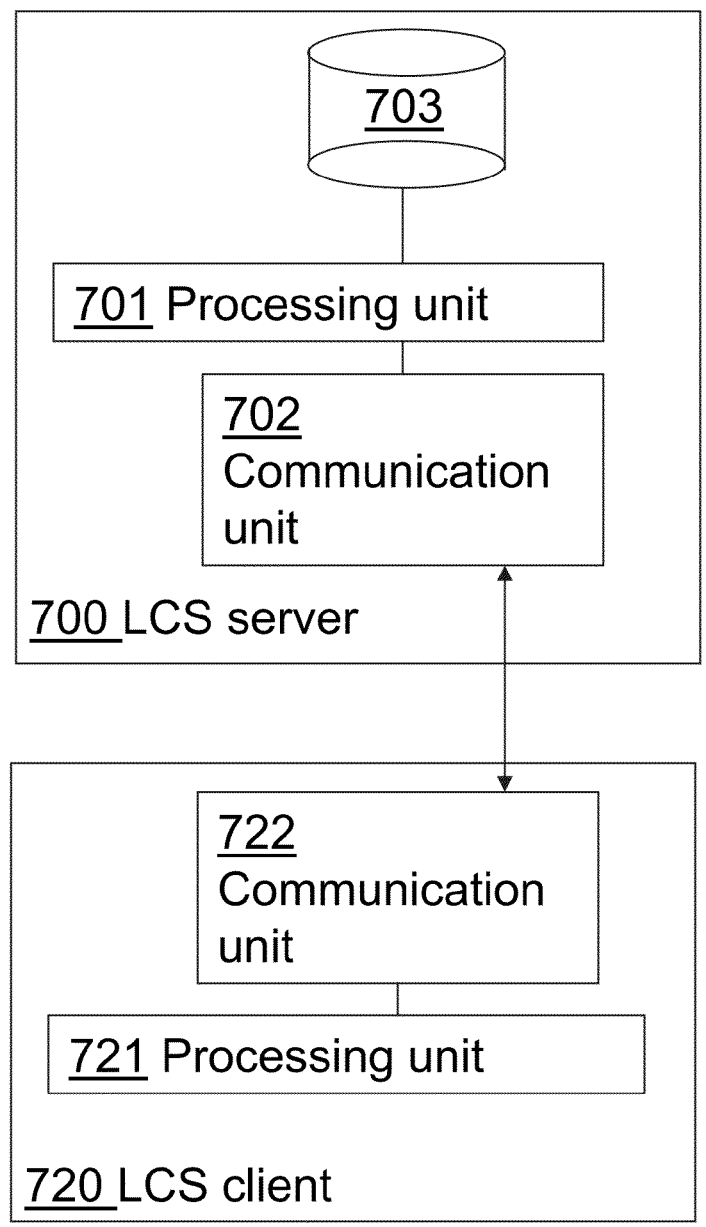
FIGS. 7a-b are block diagrams schematically illustrating an LCS server and an LCS client according to embodiments.

An LCS server 700 and an LCS client 720 are schematically illustrated in FIG. 7a, according to embodiments. Both the LCS server 700 and the LCS client 720 may comprise a communication unit each 702, 722, for communicating with other network nodes or devices.

The LCS server 700 is configured to be used in a wireless communication system for positioning of an LCS target. In one embodiment the positioning is based on an adaptive enhanced cell identity method. The LCS server 700 comprises a processing unit 701 configured to obtain information relating to a first predefined geographical area, wherein it has been determined that a probability that the LCS target is located within the first predefined geographical area is below a threshold. The processing unit is also configured to receive a request for a positioning of the LCS target, e.g. by using the communication unit 702, and to use the obtained information relating to the first predefined geographical area for the positioning of the LCS target. In one embodiment, the processing unit 701 is further configured to store the obtained information relating to the first predefined geographical area in a database 703 and to retrieve the stored information based on the received request. The database 703 is in the embodiment illustrated in FIG. 7a placed in the LCS server 700. However, it may also be placed in some other node such as the LCS target. In still another embodiment, the processing unit 701 is configured to obtain the information relating to the first predefined geographical area by receiving the information from a network node. The information relating to the first predefined geographical area may comprise at least one of the following: a first predefined geographical area description; a second geographical area description associated with the first predefined geographical area; and a condition for when the first predefined geographical area is applicable. The first predefined geographical area description may in one embodiment be a cluster of measurements with location information for LCS targets. Alternatively, the first predefined geographical area description may be a polygon determined based on the cluster of measurements with location information for LCS targets. The condition for when the first predefined geographical area is applicable may be that a time condition is fulfilled, or it may be that the LCS target corresponds to a specified LCS target. Furthermore, the first predefined geographical area may be at least one of the following: a physically restricted area; a radio access restricted area; an area where an amount of measurements with location information is below a further threshold; and an area describing an overlap of two or more location areas.

According to embodiment A described above, the processing unit 701 may be configured to use the information relating to the first predefined geographical area by adjusting a second geographical area description associated with the first predefined geographical area based on the information relating to the first predefined geographical area. The processing unit 701 may also be configured to transmit the adjusted second geographical area description to an LCS client interacting with the LCS server for the positioning of the LCS target.

Alternatively, the processing unit 701 may be configured to use the information relating to the first predefined geographical area by retrieving the second geographical area from the database, and storing the adjusted geographical area description in the database. In these alternative embodiments of how to use the information, the processing unit 701 may also be configured to adjust the second geographical area description by excluding a first predefined geographical area description comprised in the information relating to the first predefined geographical area from the second geographical area description. Alternatively, the processing unit 701 may be configured to adjust the second geographical area description by connecting a boundary of a first predefined geographical area description comprised in the information relating to the first predefined geographical area with a boundary of the second geographical area description to form an extended boundary comprising both of said boundaries, the extended boundary describing at least one area excluding the first predefined geographical area.

According to embodiment B described above, the processing unit 701 of the LCS server 700 may be configured to use the information relating to the first predefined geographical area by transmitting the information relating to the first predefined geographical area to an LCS client interacting with the LCS server for the positioning of the LCS target. The transmitted information relating to the first predefined geographical area may comprise an indicator indicating whether a geographical area description in the transmitted information is a first predefined geographical area description.

An LCS client 720 is also illustrated in FIG. 7a. The LCS client 720 is configured to be used in a wireless communication system for positioning of an LCS target, the positioning being managed by an LCS server 700 interacting with the LCS client 720 for the positioning of the LCS target. The LCS client 720 may in one embodiment be co-located with the LCS target. The LCS client 720 comprises a processing unit 721 configured to receive information relating to a first predefined geographical area from the LCS server 700, e.g. by using the communication unit 722, wherein it has been determined that a probability that the LCS target is located within the first predefined geographical area is below a threshold. The processing unit 721 of the LCS client 720 is also configured to use the received information for the positioning of the LCS target.

The information relating to the first predefined geographical area may comprise at least one of the following: a first predefined geographical area description; a second geographical area description associated with the first predefined geographical area; and a condition for when the first predefined geographical area is applicable. The first predefined geographical area description may be a cluster of measurements with location information for LCS targets. The first predefined geographical area description may alternatively be a polygon determined based on the cluster of measurements with location information for LCS targets. The condition for when the first predefined geographical area is applicable may be that a time condition is fulfilled, or that the LCS target corresponds to a specified LCS target. Furthermore, the first predefined geographical area may be at least one of the following: a physically restricted area; a radio access restricted area; an area where an amount of measurements with location information is below a further threshold; and an area describing an overlap of two or more location areas. The received information may also comprise an indicator indicating whether a geographical area description in the received information is a first predefined geographical area description. The processing unit 721 may be configured to use the received information by adjusting a position of the LCS target based on the received information.

Figure 7B:
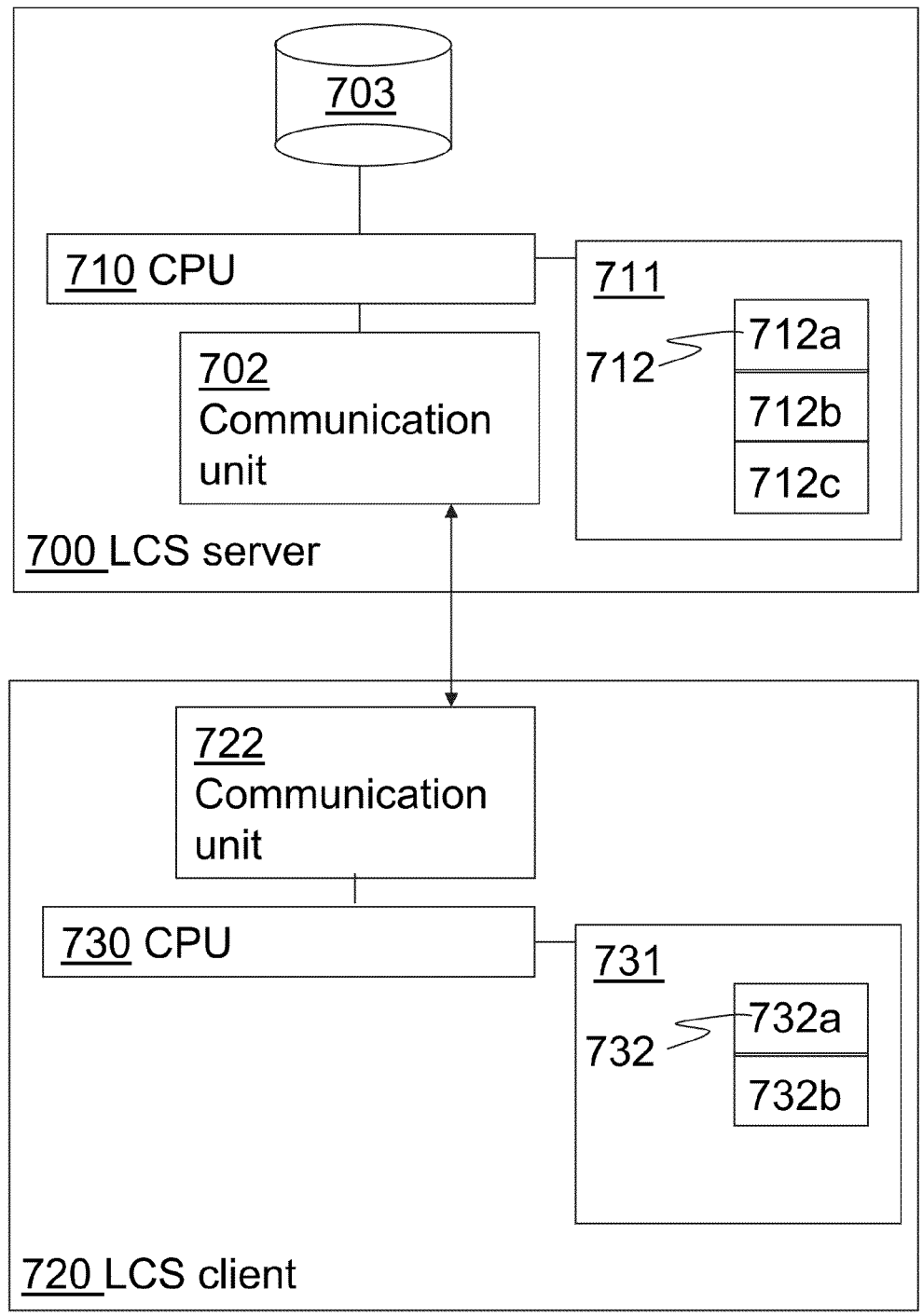

FIG. 7b schematically illustrates embodiments of the LCS server 700 and LCS client 720, which are alternative ways of disclosing the embodiments illustrated in FIG. 7a.

In FIG. 7b, the LCS server 700 comprises the communication unit 702 already described above, and a CPU 710 which may be a single unit or a plurality of units. Furthermore, the LCS server 700 comprises at least one computer program product 711 in the form of a non-volatile memory, e.g. an EEPROM (Electrically Erasable Programmable Read-Only Memory), a flash memory or a disk drive. The computer program product 711 comprises a computer program 712, which comprises code means which when run on the LCS server 700 causes the CPU 710 on the LCS server 700 to perform the steps of the procedures described earlier in conjunction with FIG. 5a. Hence in the embodiments described, the code means in the computer program 712 of the LCS server 700 comprises an obtaining module 712a for obtaining information relating to a first predefined geographical area, a receiving module 712b for receiving a request for a positioning of the LCS target, and a use module 712c for using the obtained information. The code means may thus be implemented as computer program code structured in computer program modules. The modules 712a-c essentially perform the steps 510, 520 and 530 of the flow in FIG. 5a to emulate the LCS server 700 described in FIG. 7a.

Furthermore, in FIG. 7b, the LCS client 720 comprises the communication unit 722 already described above, and a CPU 730 which may be a single unit or a plurality of units. Furthermore, the LCS client 720 comprises at least one computer program product 731 in the form of a non-volatile memory, e.g. an EEPROM (Electrically Erasable Programmable Read-Only Memory), a flash memory or a disk drive. The computer program product 731 comprises a computer program 732, which comprises code means which when run on the LCS client 720 causes the CPU 730 on the LCS client 720 to perform the steps of the procedures described earlier in conjunction with FIG. 6a. Hence in the embodiments described, the code means in the computer program 732 of the LCS client 720 comprises a receiving module 732a for receiving information relating to a first predefined geographical area from the LCS server 700, and a use module 732b for using the received information. The code means may thus be implemented as computer program code structured in computer program modules. The modules 732a-b essentially perform the steps 610, and 620 of the flow in FIG. 6a to emulate the LCS client 720 described in FIG. 7a.

Although the code means in the embodiment disclosed above in conjunction with FIG. 7b are implemented as computer program modules which when run on the LCS server 700 and on the LCS client 720 causes the LCS server and the LCS client to perform the steps described above in conjunction with FIGS. 5a and 6a respectively, one or more of the code means may in alternative embodiments be implemented at least partly as hardware circuits.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

Abbreviations
3GPP 3rd Generation Partnership Program
AEDID Adapative ECID
AGNSS Assisted Global Navigation Satellite System
A-GPS Assisted GPS
AoA Angle of Arrival
BS Base Station
CDMA Code division multiple access
CID Cell Identity
CN Core Network
CSG Closed subscriber group
E-CID Enahnced CID
eNodeB evolved Node B
E-SMLC Evolved Serving Mobile Location Center
E-UTRAN: Evolution UMTS Terrestrial Radio Access Network
FCC Federal Communications Commission
GAD Geographical Area Description
GMLC Gateway Mobile Location Center
GPS Global Positioning Service
HLR Home Location Register
HSS Home Subscriber Service
LBS Location Based Services
LCS-AP LCS-Application Protocol
LMU Location Measurement Unit
LPP LTE Positioning Protocol
LPPa LPP annex
LTE Long-Term Evolution
MME Mobility management entity
MSC Mobile Switching Centre
O&M Operation and Maintenance
OTDOA Observed Time Difference of Arrival
PSAP Public Safety Answer Point
RAN Radio Access Network
RF Radio Frequency
RNC Radio Network Controller
RRC Radio Resource Control
SLC SUPL Location Centre
SLP SUPL Location Platform
SON Self Organizing Network
SPC SUPL Positioning Center
SRS Sounding Reference Signal
SUPL Secure User Plane Location
TA Timing Advance
TOA Time Of Arrival
UE User Equipment
UMTS Universal Mobile Telecommunications System
UTDOA Uplink Time Difference Of Arrival
UTRAN Universal Terrestrial RAN
WCDMA: Wide band code division multiple access
WGS World Geodetic System

The invention claimed is:

1. A method in a location services, LCS, client of a wireless communication system for positioning of an LCS target, the positioning being managed by an LCS server interacting with the LCS client for the positioning of the LCS target, the method comprising:
receiving information relating to a first predefined geographical area from the LCS server, wherein it has been determined that a probability that the LCS target is located within the first predefined geographical area is below a threshold, and
adjusting a position of the LCS target based on the received information and the probability that the LCS target is not within the first predefined graphical area, and
wherein the first predefined geographical area is within a second larger predefined geographical area, the LCS target is more likely than not to be located within the second larger predefined geographical area that does not include the first predefined geographical area.

2. The method according to claim 1, wherein the information relating to the first predefined geographical area comprises at least one of the following: a first predefined geographical area description; a second geographical area description associated with the first predefined geographical area; and a condition for when the first predefined geographical area is applicable.

3. The method according to claim 2, wherein the first predefined geographical area description is a cluster of measurements with location information for LCS targets.

4. The method according to claim 2, wherein the first predefined geographical area description is a polygon determined based on a cluster of measurements with location information for LCS targets.

5. The method according to claim 2, wherein the condition for when the first predefined geographical area is applicable is that a time condition is fulfilled, or that the LCS target corresponds to a specified LCS target.

6. The method according to claim 1, wherein the first predefined geographical area is at least one of the following: a physically restricted area; a radio access restricted area; an area where an amount of measurements with location information is below a further threshold; and an area describing an overlap of two or more location areas.

7. The method according to claim 1, wherein the received information comprises an indicator indicating whether a geographical area description in the received information is the first predefined geographical area description, and wherein using the received information comprises adjusting a position of the LCS target based on the received information.

8. The method according to claim 1, wherein the first predefined geographical area comprises a black area in which the LCS target is less probable to be located.

9. A location services, LCS, client configured to be used in a wireless communication system for positioning of an LCS target, the positioning being managed by an LCS server interacting with the LCS client for the positioning of the LCS target, the LCS client comprising a processing unit configured to:
receive information relating to a first predefined geographical area from the LCS server, wherein it has been determined that a probability that the LCS target is located within the first predefined geographical area is below a threshold, and
adjust a position of the LCS target based on the received information and the probability that the LCS target is not within the first predefined graphical area, and
wherein the first predefined geographical area is within a second larger predefined geographical area, the LCS target is more likely than not to be located within the second larger predefined geographical area that does not include the first predefined geographical area.

10. The LCS client according to claim 9, wherein the information relating to the first predefined geographical area comprises at least one of the following: a first predefined geographical area description; a second geographical area description associated with the first predefined geographical area; and a condition for when the first predefined geographical area is applicable.

11. The LCS client according to claim 10, wherein the condition for when the first predefined geographical area is applicable is that a time condition is fulfilled, or that the LCS target corresponds to a specified LCS target.

12. The LCS client according to claim 9, wherein the first predefined geographical area is at least one of the following: a physically restricted area; a radio access restricted area; an area where an amount of measurements with location information is below a further threshold; and an area describing an overlap of two or more location areas.

13. The LCS client according to claim 9, wherein the received information comprises an indicator indicating whether a geographical area description in the received information is the first predefined geographical area description, and wherein the processing unit is configured to use the received information by adjusting a position of the LCS target based on the received information.

14. The LCS client according to claim 9, wherein the first predefined geographical area comprises a black area in which the LCS target is less probable to be located.

15. A location services, LCS, system for a wireless communications system for positioning of an LCS target, comprising:
an LCS server and an LCS client for managing the positioning of the LCS target, the LCS server being configured to:
obtain information relating to a first predefined geographical area, wherein it has been determined that a probability that the LCS target is located within the first predefined geographical area is below a threshold,
receive a request for a positioning of the LCS target, and
send the information relating to the first predefined geographical area to the LCS client, and
the LCS client being configured to:
receive the information relating to the first predefined geographical area from the LCS server, wherein it has been determined that a probability that the LCS target is located within the first predefined geographical area is below a threshold, and
adjust a position of the LCS target based on the received information and the probability that the LCS target is not within the first predefined graphical area, and
wherein the first predefined geographical area is within a second larger predefined geographical area, the LCS target being more likely than not to be located within the second larger predefined geographical area that does not include the first predefined geographical area.

16. The LCS system according to claim 15, wherein the first predefined geographical area comprises a black area in which the LCS target is less probable to be located.

* * * * *

UNITED STATES PATENT AND TRADEMARK OFFICE
CERTIFICATE OF CORRECTION

| | | |
|---|---|---|
| PATENT NO. | : 9,049,550 B2 | Page 1 of 1 |
| APPLICATION NO. | : 14/030060 | |
| DATED | : June 2, 2015 | |
| INVENTOR(S) | : Wigren et al. | |

It is certified that error appears in the above-identified patent and that said Letters Patent is hereby corrected as shown below:

In the Specification

In Column 1, Line 10, delete "11 Jan. 2011," and insert -- 12 Jan. 2011, --, therefor.

Signed and Sealed this
Twenty-fourth Day of November, 2015

Michelle K. Lee
*Director of the United States Patent and Trademark Office*